United States Patent
Nimura et al.

(10) Patent No.: US 10,240,033 B2
(45) Date of Patent: Mar. 26, 2019

(54) OPTICAL FILM AND METHOD FOR MANUFACTURING SAME, POLARIZATION PLATE, AND LIQUID CRYSTAL DISPLAY APPARATUS

(71) Applicant: FUJIFILM Corporation, Tokyo (JP)

(72) Inventors: Shigeaki Nimura, Kanagawa (JP); Makoto Kamo, Kanagawa (JP); Shusuke Arita, Kanagawa (JP); Yutaka Nozoe, Kanagawa (JP); Katsumi Sasata, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 874 days.

(21) Appl. No.: 14/642,993

(22) Filed: Mar. 10, 2015

(65) Prior Publication Data

US 2015/0183977 A1 Jul. 2, 2015

Related U.S. Application Data

(63) Continuation of application No. PCT/JP2013/074822, filed on Sep. 13, 2013.

(30) Foreign Application Priority Data

Sep. 28, 2012 (JP) ................................ 2012-218701
Oct. 19, 2012 (JP) ................................ 2012-232423
Dec. 19, 2012 (JP) ................................ 2012-276873

(51) Int. Cl.
*C08L 33/12* (2006.01)
*C08J 5/18* (2006.01)
(Continued)

(52) U.S. Cl.
CPC ........ *C08L 33/12* (2013.01); *B29D 11/00644* (2013.01); *B29D 11/00788* (2013.01);
(Continued)

(58) Field of Classification Search
CPC combination set(s) only.
See application file for complete search history.

(56) References Cited

U.S. PATENT DOCUMENTS 6,034,185 A * 3/2000 Hwang ................. C08G 59/52
                                                        525/396
6,156,865 A * 12/2000 Iji ......................... C08G 59/22
                                                        528/101
(Continued)

FOREIGN PATENT DOCUMENTS

CN     101196572 A     6/2008
CN     101802060 A     8/2010
(Continued)

OTHER PUBLICATIONS

Office Action, issued by the State Intellectual Property Office dated Mar. 30, 2016 in connection with corresponding Chinese Patent Application No. 201380042653.
(Continued)

*Primary Examiner* — Anthony J Frost
(74) *Attorney, Agent, or Firm* — Edwards Neils, LLC; Jean C. Edwards, Esq.

(57) ABSTRACT

The optical film of the present invention is an optical film including a thermoplastic resin, in which the optical film has a moisture permeability of 70 g/m²/day or less (in terms of a film thickness of 40 μm), and contains a moisture permeability-reducing compound having a molecular weight of 200 or more and satisfying Formula (1) described below. Formula (1) A/B≤0.9 (A represents a moisture permeability of an optical film in a case in which 10 mass % of the moisture permeability-reducing compound is added to the mass of the thermoplastic resin, and B represents a moisture permeability of an optical film in a case in which the
(Continued)

thermoplastic resin is included and the moisture permeability-reducing compound is not added.)

20 Claims, 2 Drawing Sheets

(51) Int. Cl.
| | |
|---|---|
| G02F 1/1335 | (2006.01) |
| G02B 5/30 | (2006.01) |
| B29D 11/00 | (2006.01) |
| C08K 5/13 | (2006.01) |
| C08K 5/3462 | (2006.01) |
| C08L 45/00 | (2006.01) |
| G02F 1/1333 | (2006.01) |
| B29K 23/00 | (2006.01) |
| B29K 25/00 | (2006.01) |
| B29K 33/00 | (2006.01) |
| B29K 105/00 | (2006.01) |
| B29K 267/00 | (2006.01) |

(52) U.S. Cl.
CPC ................................. *C08J 5/18* (2013.01); *C08K 5/13* (2013.01); *C08K 5/3462* (2013.01); *C08L 45/00* (2013.01); *G02B 5/3033* (2013.01); *G02F 1/1335* (2013.01); *B29K 2023/38* (2013.01); *B29K 2025/06* (2013.01); *B29K 2025/08* (2013.01); *B29K 2033/12* (2013.01); *B29K 2105/0085* (2013.01); *B29K 2267/04* (2013.01); *B29K 2995/0018* (2013.01); *B29K 2995/0068* (2013.01); *B29K 2995/0069* (2013.01); *G02F 1/133528* (2013.01); *G02F 2001/133311* (2013.01); *Y10T 428/105* (2015.01); *Y10T 428/1036* (2015.01); *Y10T 428/265* (2015.01); *Y10T 428/31786* (2015.04); *Y10T 428/31935* (2015.04); *Y10T 428/31938* (2015.04)

(56) References Cited

U.S. PATENT DOCUMENTS 7,125,918 B2 * 10/2006 Shimizu ............... G02B 1/105
106/162.7
2006/0257589 A1 11/2006 Hayashi et al.
2007/0134498 A1 * 6/2007 Umeyama ............ C08G 59/245
428/413
2007/0211334 A1 * 9/2007 Tsujiuchi ................. B32B 7/12
359/487.06
2009/0009693 A1 * 1/2009 Yoshikawa ........ C09K 19/3444
349/75
2010/0222517 A1 9/2010 Hino et al.
2010/0298491 A1 11/2010 Okada et al.
2012/0262646 A1 10/2012 Iwata et al.

FOREIGN PATENT DOCUMENTS

| CN | 102331590 A | 1/2012 |
|---|---|---|
| CN | 102667541 A | 9/2012 |
| JP | 2005-338736 A | 12/2005 |
| JP | 2006-243266 A | 9/2006 |
| JP | 2007-293301 A | 11/2007 |
| JP | 2010-058411 A | 3/2010 |
| JP | 2011-098442 A | 5/2011 |
| JP | 2012-001660 A | 1/2012 |
| WO | 2007/086324 A1 | 8/2007 |
| WO | 2009/047924 A1 | 4/2009 |

OTHER PUBLICATIONS

Notification of Reasons for Rejection issued by the Japanese Patent Office dated Mar. 15, 2016 in connection with corresponding Japanese Patent Application No. 2014-538395.
International Search Report issued in PCT/JP2013/074822 dated Dec. 17, 2013.
Written Opinion issued in PCT/JP2013/074822 dated Dec. 17, 2013.
Office Action issued by the State Intellectual Property Office dated Dec. 16, 2016, in connection with corresponding Chinese Patent Application No. 201380042653.X.
Office Action issued by the State Intellectual Property Office dated Jun. 20, 2017, in connection with corresponding Chinese Patent Application No. 201380042653.X.
Notice of Reasons for Rejection issued by the Korean intellectual Property Office dated Mar. 16, 2016 in connection with corresponding Korean Patent Application No. 10-2015-7002788.

* cited by examiner

OPTICAL FILM AND METHOD FOR MANUFACTURING SAME, POLARIZATION PLATE, AND LIQUID CRYSTAL DISPLAY APPARATUS

CROSS-REFERENCE TO RELATED APPLICATIONS

This application is a Continuation of PCT International Application No. PCT/JP2013/074822 filed on Sep. 13, 2013, which was published under PCT Article 21(2) in Japanese, which claims priority under 35 U.S.C § 119(a) to Japanese Patent Application No. 2012-218701 filed on Sep. 28, 2012, Japanese Patent Application No. 2012-232423 filed on Oct. 19, 2012, and Japanese Patent Application No. 2012-276873 filed on Dec. 19, 2012. The above applications are hereby expressly incorporated by reference, in their entirety, into the present application.

BACKGROUND OF THE INVENTION

1. Field of the Invention

The present invention relates to an optical film and a method for manufacturing the same, a polarization plate, and a liquid crystal display apparatus.

2. Description of the Related Art

In recent years, a liquid crystal display apparatus has been widely used as liquid crystal panels and the like in liquid crystal televisions, personal computers, mobile phones, digital cameras, and the like. Generally, a liquid crystal display apparatus includes a liquid crystal panel member provided with polarization plates on both sides of a liquid crystal cell, and is made to display images by controlling light from a back light member using the liquid crystal panel member. Here, the polarization plate is made up of a polarizer and protective films on both sides of the polarizer. An ordinary polarizer is obtained by dyeing a stretched polyvinyl alcohol (PVA)-based film using iodine or a dichromatic colorant, and a cellulose ester film or the like is used as the protective film.

In addition, it is known that, in the liquid crystal display apparatus, a polymer film is used as an optical compensation film (phase difference film) to enlarge a viewing angle, improve image coloration, and improve contrast. For the polymer film used as the optical compensation film, there has been a demand to have desired optical anisotropy by controlling the optical characteristics (for example, birefringence such as the retardation value Re in a film plane or the retardation value Rth in the film thickness direction) of the film depending on the mode of the liquid crystal cell in the liquid crystal display apparatus such as a VA mode or an IPS mode.

In response to diversification of usage as well as improvement in quality, there has been a strong demand for recent liquid crystal display apparatuses to have durability. Examples of the demanded durability include stability of the liquid crystal display apparatus against environmental changes in outdoor use and suppression of changes in dimensions or optical characteristics against changes in temperature or humidity in optical films such as the protective films for the polarization plates or the optical compensation films used in the liquid crystal display apparatus. When exposed to high temperature and humidity environments, the liquid crystal display apparatus has problems with warpage of the liquid crystal cell and the occurrence of display unevenness in the liquid crystal display apparatus, and these problems are considered to result from the fact that, when moisture permeates and is desorbed to the polarization plates and the optical films that constitute the polarization plates, the shrinkage balance between the polarization plates on the front and back surfaces of the liquid crystal cell in the liquid crystal display apparatus breaks, the liquid crystal cell warps, and the four corners or four sides of the liquid crystal cell come into contact with a housing or a member on the back surface side, thereby causing display unevenness. Therefore, there has been a demand for improvement of the humidity dependency or heat and humidity durability of the protective films for the polarization plates, the optical compensation film, and the like, and, to achieve fundamental improvements, it is necessary to suppress the permeation and desorption of moisture from environmental changes, and particularly, the optical film on the outermost surface of the polarization plate is required to have a level of performance not easily allowing the permeation of moisture, that is, the reduction of moisture permeability.

WO2009/047924A discloses an optical film obtained by adding a large amount of an acryl resin such as polymethyl methacrylate (PMMA) to cellulose ester for the purpose of providing an optical film having high transparency, low moisture absorbency, strong heat resistance, and high mechanical strength.

SUMMARY OF THE INVENTION

A liquid crystal display apparatus has been used not only for indoor usage in the related art but also in severe environments such as the outside, and obtaining a good level of performance not allowing the permeation of moisture has become important to optical films on the outermost surface of the liquid crystal display apparatus. In TV applications the size of which has been increasing, in association with the influence of the trend of glass in a liquid crystal cell becoming thinner, the liquid crystal cell is likely to be significantly warped, and there has been a concern of an influence on black display unevenness after aging in a high temperature and humidity environment. In addition, in small to medium-sized devices such as tablet PCs and mobile uses, which have been rapidly spreading in recent years, there is a strong demand for thickness reduction and space saving in the liquid crystal display apparatus, and therefore it has been strongly required to solve the problem of black display unevenness after aging in a high temperature and humidity environment.

In consideration of the above-described circumstances, an object of the present invention is to provide an optical film, which has excellent durability and is capable of reducing the permeation and desorption of moisture, and a method for manufacturing the same.

Another object of the present invention is to provide a polarization plate for which the above-described optical film is used. Still another object of the present invention is to provide a liquid crystal display apparatus in which black display unevenness after aging in a high temperature and humidity environment is improved.

The objects of the present invention can be achieved by the following means.

[1] An optical film including a thermoplastic resin, in which the optical film has a moisture permeability of 70 g/m$^2$/day or less in terms of a film thickness of 40 μm, and contains a moisture permeability-reducing compound having a molecular weight of 200 or more and satisfying Formula (1) described below.

$$A/B \leq 0.9 \quad \text{Formula (1)}$$

(In Formula (1), A represents a moisture permeability of an optical film in a case in which 10 mass % of the moisture permeability-reducing compound is added to the mass of the thermoplastic resin, and B represents a moisture permeability of an optical film in a case in which the thermoplastic resin is included and the moisture permeability-reducing compound is not added. Here, the moisture permeability is a moisture permeability in terms of a film thickness of 40 μm of the optical film after 24 hours at 40° C. under a relative humidity of 90% using a method of JIS Z-0208.)

[2] The optical film according to [1], in which Formula (2) described below is preferably satisfied.

$$a/B \leq 0.9 \qquad \text{Formula (2)}$$

(In Formula (2), a represents a moisture permeability of an optical film in a case in which the thermoplastic resin and the moisture permeability-reducing compound are included, and B represents a moisture permeability of an optical film in a case in which the thermoplastic resin is included and the moisture permeability-reducing compound is not added. Here, the moisture permeability is a moisture permeability in terms of a film thickness of 40 μm of the optical film after 24 hours at 40° C. under a relative humidity of 90% using the method of JIS Z-0208.)

[3] The optical film according to [1] or [2], in which the moisture permeability-reducing compound preferably has one or more aromatic rings.

[4] The optical film according to any one of [1] to [3], in which the moisture permeability-reducing compound is preferably a compound represented by General Formula (B) described below, a phenolic resin, a terpene resin, an aromatic hydrocarbon formaldehyde resin, or barbituric acid.

[Chem. 1]

General Formula (B)

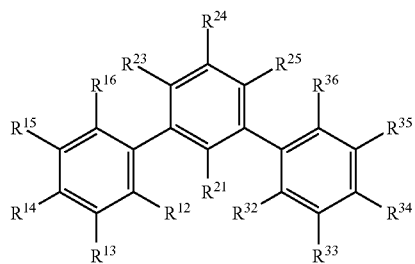

(In General Formula (B), each of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ independently represents a hydrogen atom or a substituent, and at least one of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ is an amino group, an acylamino group, an alkoxycarbonylamino group, an aryloxycarbonylamino group, a sulfonylamino group, a hydroxyl group, a mercapto group, or a carboxyl group.)

[5] The optical film according to any one of [1] to [4], in which the moisture permeability-reducing compound is preferably a novolac-type phenolic resin, a hydrogenated terpene resin, a xylene resin, or barbituric acid.

[6] The optical film according to any one of [1] to [5], in which the moisture permeability-reducing compound is preferably a novolac-type phenolic resin, a hydrogenated terpene resin, or a xylene resin.

[7] The optical film according to any one of [1] to [6], in which the moisture permeability-reducing compound preferably has three or more aromatic rings.

[8] The optical film according to any one of [1] to [7], in which the moisture permeability-reducing compound is preferably represented by General Formula (C) described below.

[Chem. 2]

General Formula (C)

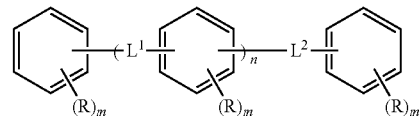

(In General Formula (C), n represents 1 to 10, each of ms independently represents an integer of 1 to 4, each of Rs independently represents a hydrogen atom, a —OH group, or an alkyl group having 1 to 10 carbon atoms which may have a substituent, and each of $L^1$ and $L^2$ independently represents a methylene group or —$CH_2$—O—$CH_2$—. Here, at least one of Rs represents a group having a —OH group.)

[9] The optical film according to any one of [1] to [8], in which the moisture permeability-reducing compound is preferably a novolac-type phenolic resin or a xylene resin.

[10] The optical film according to any one of [1] to [9], preferably including 1 mass % or more of the moisture permeability-reducing compound with respect to the mass of the thermoplastic resin.

[11] The optical film according to any one of [1] to [10], in which the film thickness is preferably 60 μm or less.

[12] The optical film according to any one of [1] to [11], in which Re and Rth defined by Formula (I) described below and Formula (II) described below preferably satisfy Formula (III) described below and Formula (IV) described below at a wavelength of 590 nm.

$$Re=(nx-ny) \times d \qquad \text{Formula (I)}$$

$$Rth=\{(nx+ny)/2-nz\} \times d \qquad \text{Formula (II)}$$

$$|Re| \leq 50 \text{ nm} \qquad \text{Formula (III)}$$

$$|Rth| \leq 300 \text{ nm} \qquad \text{Formula (IV)}$$

(In Formulae (I) to (IV), nx is a refractive index in an in-plane slow axis direction of the optical film, ny is a refractive index in an in-plane fast axis direction of the optical film, nz is a refractive index in a thickness direction of the optical film, and d is a thickness (nm) of the optical film.)

[13] The optical film according to any one of [1] to [12], in which the optical film is preferably manufactured by casting a macromolecular solution including the thermoplastic resin, the moisture permeability-reducing compound, and a solvent on a support.

[14] The optical film according to any one of [1] to [13], in which a functional layer having a film thickness in a range of 0.1 μm to 20 μm is preferably present on at least one surface of the optical film.

[15] The optical film according to [14], in which a moisture permeability (C) of the optical film in a case in which the functional layer is laminated and a moisture permeability (D) of the optical film in a case in which the functional layer is not laminated preferably satisfy C/D≤0.9.

[16] A method for manufacturing an optical film, including a step of forming a macromolecular film by casting a thermoplastic resin and a moisture permeability-reducing compound on a support, in which a molecular weight of the moisture permeability-reducing compound is 200 or more, and the moisture permeability-reducing compound satisfies Formula (1) described below.

$$A/B \leq 0.9 \qquad \text{Formula (1)}$$

(In Formula (1), A represents a moisture permeability of an optical film in a case in which 10 mass % of the moisture permeability-reducing compound is added to the mass of the thermoplastic resin, and B represents a moisture permeability of an optical film in a case in which the thermoplastic resin is included and the moisture permeability-reducing compound is not added. Here, the moisture permeability is a moisture permeability in terms of a film thickness of 40 μm of the optical film after 24 hours at 40° C. under a relative humidity of 90% using a method of JIS Z-0208.)

[17] The method for manufacturing an optical film according to [16], in which the optical film preferably satisfies Formula (2) described below.

$$a/B \leq 0.9 \qquad \text{Formula (2)}$$

(In Formula (2), a represents a moisture permeability of an optical film in a case in which the thermoplastic resin and the moisture permeability-reducing compound are included, and B represents a moisture permeability of an optical film in a case in which the thermoplastic resin is included and the moisture permeability-reducing compound is not added. Here, the moisture permeability is a moisture permeability in terms of a film thickness of 40 μm of the optical film after 24 hours at 40° C. under a relative humidity of 90% using the method of JIS Z-0208.)

[18] The method for manufacturing an optical film according to [16] or [17], preferably further including a step of stretching the optical film.

[19] A polarization plate including at least one of the optical film according to any one of [1] to [15] as a protective film for a polarizer.

[20] A liquid crystal display apparatus including a liquid crystal cell; and the polarization plate according to [19] disposed in at least one side of the liquid crystal cell, in which the optical film is disposed so as to serve as an outermost layer.

According to the present invention, it is possible to provide an optical film, which has excellent durability and is capable of reducing the permeation and desorption of moisture, and a method for manufacturing the same. When the optical film of the present invention is used, it is possible to provide a liquid crystal display apparatus in which the occurrence of black display unevenness after aging in a high temperature and humidity environment is suppressed.

DESCRIPTION OF THE PREFERRED EMBODIMENTS

Figure 1:
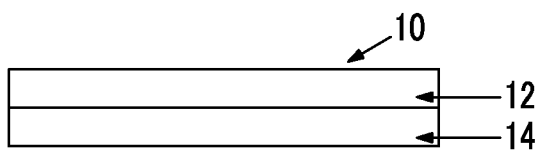
FIG. 1 is a top view of an example of an optical film of the present invention.

Hereinafter, a polarization plate of the present invention, a method for manufacturing the same, additives that are used in the polarization plate, and the like will be described in detail.

In some cases, constitution requirements described below will be described on the basis of typical embodiments of the present invention, but the present invention is not limited to the embodiments. In the present specification, numerical ranges expressed using "to" refer to ranges including the numerical values before and after the "to" as the upper limit value and the lower limit value.

An "acryl resin" refers to a resin obtained by polymerizing derivatives of methacrylic acid or acrylic acid and a resin containing the derivatives. In addition, unless particularly limited, "(meth)acrylate" refers to acrylate and methacrylate, and "(meth)acryl" refers to acryl and methacryl.

Furthermore, the "slow axis direction" of a film refers to a direction in which the refractive index in the film plane reaches the maximum, and the "fast axis direction" refers to a direction orthogonal to the slow axis in the film plane.

[Optical Film]

An optical film of the present invention is an optical film including a thermoplastic resin, in which the optical film has a moisture permeability of 70 g/m²/day or less (in terms of a film thickness of 40 μm), and contains a moisture permeability-reducing compound having a molecular weight of 200 or more and satisfying Formula (1) described below.

$$A/B \leq 0.9 \qquad \text{Formula (1)}$$

(In Formula (1), A represents a moisture permeability of an optical film in a case in which 10 mass % of the moisture permeability-reducing compound is added to the mass of the thermoplastic resin, and B represents a moisture permeability of an optical film in a case in which the thermoplastic resin is included and the moisture permeability-reducing compound is not added. Here, the moisture permeability is a moisture permeability in terms of a film thickness of 40 μm of the optical film after 24 hours at 40° C. under a relative humidity of 90% using a method of JIS Z-0208.)

In the above-described constitution, the durability is excellent, and the permeation and desorption of moisture can be reduced.

Furthermore, the optical film of the present invention preferably satisfies Formula (2) described below.

$$a/B \leq 0.9 \qquad \text{Formula (2)}$$

(In Formula (2), a represents a moisture permeability of an optical film in a case in which the thermoplastic resin and the moisture permeability-reducing compound are included, and B represents a moisture permeability of an optical film in a case in which the thermoplastic resin is included and the moisture permeability-reducing compound is not added. Here, the moisture permeability is a moisture permeability in terms of a film thickness of 40 μm) of the optical film after 24 hours at 40° C. under a relative humidity of 90% using the method of JIS Z-0208.)

The a/B is preferably 0.8 or less, more preferably 0.6 or less, and particularly preferably 0.4 or less.

Hereinafter, a preferable aspect of the constitution of the optical film of the present invention will be described.

<Thermoplastic Resin>

Hereinafter, a thermoplastic resin used in the present invention will be described.

In the film of the present invention, examples of an optimal thermoplastic resin include a (meth)acryl-based resin, a polycarbonate-based resin, a polystyrene-based resin, and a cyclic polyolefin-based resin, and it is possible to select one from the above-described resins and resin mixtures of a plurality of the resins.

The (meth)acryl-based resin includes both a methacryl-based resin and an acryl-based resin. In addition, the (meth)

acryl-based resin also include derivatives of acrylate/methacrylate, particularly, (co)polymers of acrylate ester/methacrylate ester.

((Meth)Acryl-Based Resin)

There is no particular limitation regarding the repeating structural unit of the (meth)acryl-based resin. The (meth)acryl-based resin preferably has a repeating structural unit derived from a (meth)acrylic acid ester monomer as the repeating structural unit.

The (meth)acryl-based resin may further have a repeating structural unit built by polymerizing at least one selected from hydroxyl group-containing monomers, unsaturated carboxylic acid, and monomers expressed by General Formula (201) described below as the repeating structural unit.

$$CH_2=C(X)R^{201}$$ General Formula (201)

(In the formula, $R^{201}$ represents a hydrogen atom or a methyl group, X represents a hydrogen atom, an alkyl group having 1 to 20 carbon atoms, an aryl group, a —CN group, a —CO—$R^{202}$ group, or a —O—CO—$R^{203}$ group, and each of $R^{202}$ and $R^{203}$ represents a hydrogen atom or an organic residue having 1 to 20 carbon atoms.)

The (meth)acrylic acid ester is not particularly limited, and examples thereof include acrylic acid esters such as methyl acrylate, ethyl acrylate, n-butyl acrylate, isobutyl acrylate, t-butyl acrylate, cyclohexyl acrylate, and benzyl acrylate; methacrylic acid esters such as methyl methacrylate, ethyl methacrylate, propyl methacrylate, n-butyl methacrylate, isobutyl methacrylate, t-butyl methacrylate, cyclohexyl methacrylate, and benzyl methacrylate; and the like. The (meth)acrylic acid ester may be singly used, or two or more (meth)acrylic acid esters may be jointly used. Among them, in terms of excellent heat resistance and transparency, methyl methacrylate is particularly preferred.

In a case in which the (meth)acrylic acid ester is used, the content ratio thereof in monomer components provided to a polymerization step is preferably in a range of 10 weight % to 100 weight %, more preferably in a range of 40 weight % to 100 weight %, and particularly preferably in a range of 50 weight % to 100 weight % since the effects of the present invention are sufficiently exhibited.

The hydroxyl group-containing monomer is not particularly limited, and examples thereof include 2-(hydroxyalkyl) acrylic acid ester such as α-hydroxymethyl styrene, α-hydroxyethyl styrene, and 2-(hydroxyethyl) methyl acrylate; 2-(hydroxyalkyl)acrylic acid such as 2-(hydroxyethyl)acrylate; and the like. The hydroxyl group-containing monomer is singly used, and two or more hydroxyl group-containing monomers may be jointly used.

In a case in which the hydroxyl group-containing monomer is used, the content ratio thereof in monomer components provided to a polymerization step is preferably in a range of 0 weight % to 30 weight %, more preferably in a range of 0 weight % to 20 weight %, still more preferably in a range of 0 weight % to 15 weight %, and particularly preferably in a range of 0 weight % to 10 weight % since the effects of the present invention are sufficiently exhibited.

Examples of the unsaturated carboxylic acid include acrylic acid, methacrylic acid, crotonic acid, α-substituted acrylic acid, α-substituted methacrylic acid, and the like. The unsaturated carboxylic acid may be singly used, or two or more unsaturated carboxylic acids may be jointly used. Among them, acrylic acid and methacrylic acid are particularly preferred since the effects of the present invention are sufficiently exhibited.

In a case in which the unsaturated carboxylic acid is used, the content ratio thereof in monomer components provided to a polymerization step is preferably in a range of 0 weight % to 30 weight %, more preferably in a range of 0 weight % to 20 weight %, still more preferably in a range of 0 weight % to 15 weight %, and particularly preferably in a range of 0 weight % to 10 weight % since the effects of the present invention are sufficiently exhibited.

Examples of the monomer expressed by General Formula (201) include styrene, vinyl toluene, α-methylstyrene, acrylonitrile, methylvinyl ketone, ethylene, propylene, vinyl acetate, and the like. The monomer may be singly used, or two or more monomers may be jointly used. Among them, styrene and α-methylstyrene are particularly preferred since the effects of the present invention are sufficiently exhibited.

In a case in which the monomer expressed by General Formula (201) is used, the content ratio thereof in monomer components provided to a polymerization step is preferably in a range of 0 weight % to 30 weight %, more preferably in a range of 0 weight % to 20 weight %, still more preferably in a range of 0 weight % to 15 weight %, and particularly preferably in a range of 0 weight % to 10 weight % since the effects of the present invention are sufficiently exhibited.

A lactone ring may be formed after the monomer component is polymerized. In this case, it is preferable to obtain a polymer having a hydroxyl group and an ester group in a molecular chain by polymerizing the monomer component.

An aspect of the polymerization reaction for obtaining the polymer having a hydroxyl group and an ester group in a molecular chain by polymerizing the monomer component is preferably a polymerization aspect in which a solvent is used, and particularly preferably solution polymerization.

For example, a polymerization reaction into which a cyclic structure described in the following publications is introduced is also preferred. The lactone ring structure is described in JP2007-316366A, JP2005-189623A, WO2007/032304A, and WO2006/025445A.

(Lactone Ring-Containing Polymer)

A lactone ring-containing polymer is not particularly limited as long as the polymer has the lactone ring, but preferably has a lactone ring structure expressed by General Formula (401) described below.

[Chem. 3]

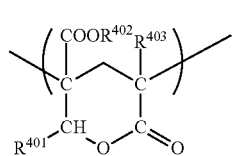

General Formula (401)

In General Formula (401), each of $R^{401}$, $R^{402}$, and $R^{403}$ independently represents a hydrogen atom or an organic residue having 1 to 20 carbon atoms, and the organic residue may contain an oxygen atom. Here, the organic residue having 1 to 20 carbon atoms is preferably a methyl group, an ethyl group, an isopropyl group, an n-butyl group, a t-butyl group, or the like.

The content ratio of the lactone ring structure expressed by General Formula (401) in the structure of the lactone ring-containing polymer is preferably in a range of 5 mass % to 90 mass %, more preferably in a range of 10 mass % to 70 mass %, still more preferably in a range of 10 mass % to 60 mass %, and particularly preferably in a range of 10 mass % to 50 mass %. When the content ratio of the lactone ring structure is set to 5 mass % or more, the heat resistance and surface hardness of the obtained polymer tend to improve, and when the content ratio of the lactone ring structure is set to 90 mass % or less, the molding workability of the obtained polymer tends to improve.

A method for manufacturing the lactone ring-containing polymer is not particularly limited, and the lactone ring-containing polymer is preferably obtained by obtaining a polymer (p) having a hydroxyl group and an ester group in the molecular chain through a polymerization step of adding a monomer having a hydroxyl group and an ester group in the molecular chain, which is described in paragraphs <0027> to <0030> in JP2007-316366A, and then carrying out a lactone ring condensation step of introducing the lactone ring structure into the polymer by heating the obtained polymer (p).

The weight average molecular weight of the lactone ring-containing polymer is preferably in a range of 1000 to 2000000, more preferably in a range of 5000 to 1000000, still more preferably in a range of 10000 to 500000, and particularly preferably in a range of 50000 to 500000.

The weight average molecular weight Mw of the acryl resin used in the present invention is preferably 80000 or more. When the weight average molecular weight Mw of the acryl resin is 80000 or more, the mechanical strength is high, and the handling aptitude during the manufacture of a film is excellent. From the above-described viewpoint, the weight average molecular weight Mw of the acryl resin is preferably 100000 or more. In addition, from the viewpoint of improving the compatibility with cellulose ester, the weight average molecular weight Mw of the acryl resin is preferably 3000000 or less, and more preferably 2000000 or less.

As the acryl resin used in the present invention, a commercially available product can be used. Examples thereof include DELPET 60N, and 80N (manufactured by Asahi Kasei Chemicals Corporation), DIANAL BR80, BR85, BR88, and BR102 (manufactured by Mitsubishi Rayon Co., Ltd.), KT75 (manufactured by Denki Kagaku Kogyo Kabushiki Kaisha), and the like.

It is also possible to jointly use two or more acryl resins.
(Polycarbonate-Based Resin)

As the thermoplastic resin that can be used in the present invention, it is possible to use the polycarbonate-based resin to which additives are added to appropriately control peeling force or toughness.

An arbitrary appropriate polycarbonate can be employed as the polycarbonate-based resin. Particularly, aromatic polycarbonate made up of an aromatic divalent phenol component and a carbonate component is preferred. The aromatic polycarbonate can preferably be obtained from a reaction between an aromatic divalent phenol compound and a carbonate precursor. Specifically, the aromatic polycarbonate can be obtained using a phosgene method in which phosgene is blown into an aromatic divalent phenol compound in the presence of a caustic alkali and a solvent or an ester exchange method in which an aromatic divalent phenol compound and bisarylcarbonate are ester-exchanged in the presence of a catalyst.

The aromatic divalent phenol compound is not particularly limited, and examples thereof include 2.2-bis(4-hydroxyphenyl)propane, 9,9-bis(4-hydroxyphenyl)fluorene, 4,4'-biphenol, 4,4'-dihydroxybiphenylether, 2,2-bis(3-methyl-4-hydroxyphenyl)propane, 2,2-bis(3-boromo-4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-dimethylphyenyl)butane, 2,2-bis(4-hydroxy-3,5-dipropylphenyl)propane, 1,1-bis(4-hydroxyphenyl)cyclohexane, 1,1-bis(4-hydroxyphenyl)-3,3,5-trimethylcyclohexane, and the like. The aromatic divalent phenol compound may be singly used, or two or more aromatic divalent phenol compounds may be jointly used.

The carbonate precursor is not particularly limited, and examples thereof include phosgene, bis chloroformate of the divalent phenol compound, diphenyl carbonate, di-p-tolyl carbonate, phenyl-p-tolyl carbonate, di-p-chlorophenyl carbonate, dinaphthyl carbonate, and the like, and among them, phosgene and diphenyl carbonate are preferred. The carbonate precursor may be singly used, or two or more carbonate precursors may be jointly used.

The weight average molecular weight of the polycarbonate is 10000 or more, and more preferably 50000 or more. When the weight average molecular weight is less than 10000, it is not possible to obtain a film having strong elongation characteristics or excellent heat resistance. The upper limit of the weight average molecular weight is not particularly limited; however, when the weight average molecular weight is 1500000 or more, an increase in the stretching tension causes the occurrence of film breakage, which is not preferable. When the weight average molecular weight is within the above-described range, the mechanical strength is excellent, and the degree of solubility, moldability, the operability of casting, and the like become favorable.

(Polystyrene-Based Resin)

As the thermoplastic resin that can be used in the present invention, it is possible to use the polystyrene-based resin to which additives are added to appropriately control peeling force or toughness.

Examples of the polystyrene-based resin include poly (alkylstyrene) such as polystyrene, poly(p-, m-, or o-methylstyrene), poly(2,4-, 2,5-, 3,4-, or 3,5-dimethylstyrene), and poly(p-tertiarybutylstyrene), poly(halogenated styrene) such as poly(p-, m-, or o-chlorostyrene), poly(p-, m-, or o-boromostyrene), and poly(p-, m-, or o-fluorostyrene), and poly (o-methyl-p-fluorostyrene), poly(halogen-substituted alkylstyrene) such as poly(p-, m-, o-chloromethylstyrene), poly (alkoxystyrene) such as poly(p-, m-, or o-methoxystyrene) and poly(p-, m-, o-ethoxystyrene), poly(carboxyalkylstyrene) such as poly(p-, m-, or o-carboxymethylstyrene), poly (alkyletherstyrene) such as poly(p-vinylbenzylpropylether), poly(alkylsilylstyrene) such as poly(p-trimethylsilystyrene), furthermore, poly(vinylbenzyldimethoxyphosphide), and the like.

In the present invention, among the polystyrene-based polymers, polystyrene is particularly preferred. In addition, the polystyrene-based polymer used in the present invention is not necessarily a single compound, and may be a mixture with another polystyrene-based polymer, a copolymer, or a mixture thereof. To control properties, it is also possible to copolymerize vinyl toluene, α-methylstyrene, acrylonitrile, methyl vinyl ketone, ethylene, propylene, vinyl acetate, maleic anhydride, or the like.

As the polystyrene-based resin used in the present invention, a commercially available product may be used. Examples of a polystyrene resin include polystyrene G9504, G9401, G9305, and SGP-10 (manufactured by Polystyrene Japan Corporation), and HYBRANCH XC-540HB and XC-520, and DICSTYRENE CR-250, CR-350, and CR-450 (manufactured by DIC Corporation), examples of a styrene-acrylonitrile copolymer include CEVIAN N020SF, 050SF, 0705SF, and 080SF (manufactured by Daicel Polymer Ltd.), and examples of a styrene-maleic anhydride copolymer include XIRAN SZ28110, SZ26180, SZ26120, SZ26080, SZ23110, SZ15170, and SZ08250 (manufactured by Polyscope Polymers B. V.), and the like.

The weight average molecular weight of the polystyrene-based polymer used in the present invention is preferably 10000 or more, and more preferably 50000 or more. With the polystyrene-based polymer having a weight average molecular weight of less than 10000, it is not possible to obtain a film having strong elongation characteristics or excellent heat resistance. The upper limit of the weight average molecular weight is not particularly limited; however, when the weight average molecular weight is 1500000 or more, an increase in the stretching tension causes the occurrence of film breakage, which is not preferable.

(Cyclic Polyolefin-Based Resin)

Examples of the thermoplastic resin that can be used in the present invention include cyclic polyolefin-based resins. The cyclic polyolefin-based resin refers to a polymer resin having a cyclic olefin structure.

Examples of the polymer resin having a cyclic olefin structure that is used in the present invention include (1) norbornene-based polymers, (2) polymers of a monocyclic olefin, (3) polymers of cyclic conjugated diene, (4) vinyl alicyclic hydrocarbon polymers, (5) hydrides of (1) to (4), and the like.

A polymer preferable in the present invention is an addition (co)polymer cyclic polyolefin-based resin having at least one repeating unit expressed by General Formula (II) described below and an addition (co)polymer cyclic polyolefin-based resin formed by further having at least one repeating unit expressed by General Formula (I) as necessary. In addition, a ring-opened (co)polymer having at least one cyclic repeating unit expressed by General Formula (III) can also be preferably used.

[Chem. 4]

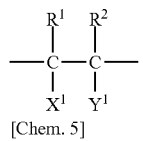

General Formula (I)

[Chem. 5]

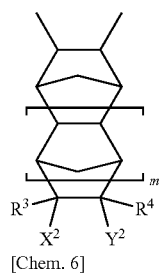

General Formula (II)

[Chem. 6]

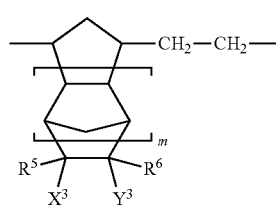

General Formula (III)

In Formulae (I) to (III), m represents an integer of 0 to 4. Each of $R^1$ to $R^6$ represents a hydrogen atom or a hydrocarbon group having 1 to 10 carbon atoms, and each of $X^1$ to $X^3$ and $Y^1$ to $Y^3$ represents a hydrogen atom, a hydrocarbon group having 1 to 10 carbon atoms, a halogen atom, a hydrocarbon group having 1 to 10 carbon atoms which is substituted by a hydrogen atom, —$(CH_2)_n COOR^{11}$, —$(CH_2)_n OCOR^{12}$, —$(CH_2)_n NCO$, —$(CH_2)_n NO_2$, —$(CH_2)_n CN$, —$(CH_2)_n CONR^{13}R^{14}$, —$(CH_2)_n NR^{13}R^{14}$, —$(CH_2)_n OZ$, —$(CH_2)_n W$, or (—$CO)_2 O$ or (—$CO)_2 NR^{15}$ which is constituted of $X^1$ and $Y^1$, $X^2$ and $Y^2$, or $X^3$ and $Y^3$. Each of $R^{11}$, $R^{12}$, $R^{13}$, $R^{14}$, and $R^{15}$ represents a hydrogen atom or a hydrocarbon group having 1 to 20 carbon atoms, Z represents a hydrocarbon group or a hydrocarbon group substituted by a halogen, W represents $SiR^{16}{}_p D_{3-p}$ ($R^{16}$ represents a hydrocarbon group having 1 to 10 carbon atoms, D represents a halogen atom, —$OCOR^{16}$, or —$OR^{16}$, and p represents an integer of 0 to 3), and n represents an integer of 0 to 10.

When a highly polarizable functional group is introduced into a substituent in $X^1$ to $X^3$ and $Y^1$ to $Y^3$, it is possible to increase the thickness direction retardation (Rth) of the optical film, and increase the developing properties of the in-plane retardation (Re). When a film having great Re developing properties is stretched in a film-forming step, it is possible to increase the Re value.

A norbornene-based polymer hydride is produced by carrying out the addition polymerization or metathesis ring-opening polymerization of a polycyclic unsaturated compound, and then adding hydrogen as disclosed in JP1989-240517A (JP-H01-240517A), JP1995-196736A (JP-H07-196736A), JP1985-26024A (JP-S60-26024A), JP1987-19801A (JP-S62-19801A), JP2003-1159767A, JP2004-309979A, or the like. In a norbornene-based polymer used in the present invention, each of $R^5$ and $R^6$ is preferably a hydrogen atom or —$CH_3$, each of $X^3$ and $Y^3$ is preferably a hydrogen atom, Cl, or —$COOCH_3$, and other groups are appropriately selected. The norbornene-based resins have been launched under trade names of ARTON G or ARTON F (ARTON F5023 and the like) by JSR Corporation, and has been made commercially available under trade names of ZEONOR ZF14, or ZF16, or ZEONEX 250 or ZEONEX 280 by Zeon Corporation, and thus the above-described norbornene-based resins can be used.

The norbornene-based addition (co)polymers are disclosed in JP1998-7732A (JP-H10-7732A), JP2002-504184A, US2004/229157A, WO2004/070463A, and the like. The norbornene-based addition (co)polymer can be obtained by addition-polymerizing norbornene-based polycyclic unsaturated compounds. In addition, it is also possible to addition-polymerize, as necessary, a norbornene-based polycyclic unsaturated compound and a linear diene compound such as ethylene, propylene, or butene; conjugated diene such as butadiene or isoprene; non-conjugated diene such as ethylidene norbornene; acrylonitrile, acrylic acid, methacrylic acid, maleic anhydride, acrylic acid ester, methacrylic acid ester, maleimide, vinyl acetate, or vinyl chloride. The norbornene-based addition (co)polymers have been launched under trade names of APEL by Mitsui Chemicals, Inc., and there are grades having different glass transition temperature (Tg), for example, APL8008T (Tg 70° C.), APL6013T, (Tg 125° C.), or APL6015T (Tg 145° C.). Polyplastics Co., Ltd. has launched pellets of TOPAS8007, TOPAS6013, TOPAS6015, and the like. Furthermore, Ferrania Imaging Technologies has launched Appear3000.

In the present invention, there is no particular limitation regarding the glass transition temperature (Tg) of the cyclic polyolefin-based resin, and it is also possible to use a cyclic polyolefin-based resin having a high Tg in a range of, for example, 200° C. to 400° C.

(Glutaric Anhydride-Based Resins)

Examples of the thermoplastic resin that can be used in the present invention include glutaric anhydride-based resins. Here, the glutaric anhydride-based resins refer to polymer resins having a glutaric anhydride unit.

A polymer having a glutaric anhydride unit preferably has a glutaric anhydride unit expressed by General Formula (101) described below (hereinafter, referred to as glutaric anhydride unit).

[Chem. 7]

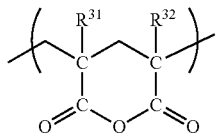

General Formula (101)

In General Formula (101), each of $R^{31}$ and $R^{32}$ independently represents a hydrogen atom or an organic residue having 1 to 20 carbon atoms. The organic residue may have an oxygen atom. $R^{31}$ and $R^{32}$ particularly preferably represent identical or different hydrogen atoms or alkyl groups having 1 to 5 carbon atoms.

The polymer having a glutaric anhydride unit is preferably an acryl-based copolymer containing a glutaric anhydride unit. An acryl-based thermoplastic copolymer preferably has a glass transition temperature (Tg) of 120° C. or higher in terms of heat resistance.

The content of the glutaric anhydride unit in the acryl-based thermoplastic copolymer is preferably in a range of 5 mass % to 50 mass %, and more preferably in a range of 10 mass % to 45 mass %. When the content is set to 5 mass % or more, and more preferably 10 mass % or more, a heat resistance-improving effect can be obtained, and furthermore, it is also possible to obtain a weather resistance-improving effect.

The acryl-based thermoplastic copolymer preferably further has a repeating unit based on unsaturated carboxylic acid alkyl ester. The repeating unit based on unsaturated carboxylic acid alkyl ester is preferably, for example, a repeating unit expressed by General Formula (102) described below.

—[CH$_2$—C($R^{41}$)(COOR$^{42}$)]—  General Formula (102)

In General Formula (102), $R^{41}$ represents hydrogen or an alkyl group having 1 to 5 carbon atoms, and $R^{42}$ represents an aliphatic or alicyclic hydrocarbon group having 1 to 6 carbon atoms or an aliphatic or alicyclic hydrocarbon group having 1 to 6 carbon atoms substituted by hydroxyl groups or halogens as many as one to the number of carbon atoms.

A monomer corresponding to a repeating unit expressed by General Formula (102) is expressed by General Formula (103) described below.

CH$_2$=C($R^{41}$)(COOR$^{42}$)  General Formula (103)

Specific preferable examples of the monomer include methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4,5,6-pentahydroxyhexyl (meth)acrylate, 2,3,4,5-tetrahydroxypentyl (meth)acrylate, and the like, and among them, methyl methacrylate is most preferably used. The monomer may be singly used, or two or more monomers may be jointly used.

The content of the unsaturated carboxylic acid alkyl ester-based unit in the acryl-based thermoplastic copolymer is preferably in a range of 50 mass % to 95 mass %, and more preferably in a range of 55 mass % to 90 mass %. The acryl-based thermoplastic copolymer having the glutaric anhydride unit and the unsaturated carboxylic acid alkyl ester-based unit can be obtained by, for example, polymerizing and cyclizing a copolymer having the unsaturated carboxylic acid alkyl ester-based unit and an unsaturated carboxylic acid unit.

The unsaturated carboxylic acid unit is preferably expressed by, for example, General Formula (104) described below.

—[CH$_2$—C($R^{51}$)(COOH)]—  General Formula (104)

Here, $R^{51}$ represents hydrogen or an alkyl group having 1 to 5 carbon atoms.

Specific examples of the preferable monomer that derives the unsaturated carboxylic acid unit include compounds expressed by General Formula (105) described below, which are monomers corresponding to the repeating unit expressed by General Formula (104), maleic acid, furthermore, hydrolysates of maleic anhydride, and the like, and in terms of excellent thermal stability, acrylic acid and methacrylic acid are preferred, and methacrylic acid is more preferred.

CH$_2$=C($R^{51}$)(COOH)  General Formula (105)

The monomer may be singly used, or two or more monomers may be jointly used. As described above, since the acryl-based thermoplastic copolymer having the glutaric anhydride unit and the unsaturated carboxylic acid alkyl ester-based unit can be obtained by, for example, polymerizing and cyclizing a copolymer having the unsaturated carboxylic acid alkyl ester-based unit and an unsaturated carboxylic acid unit, the unsaturated carboxylic acid unit may remain in the constituting unit.

The content of the unsaturated carboxylic acid unit in the acryl-based thermoplastic copolymer is preferably 10 mass % or less, and more preferably 5 mass % or less. When the content of the unsaturated carboxylic acid unit is set to 10 mass % or less, it is possible to prevent the degradation of colorless transparency and retention stability.

The acryl-based thermoplastic copolymer may have other vinyl-based monomer units having no aromatic ring as long as the effects of the present invention are not impaired. Specific examples of other vinyl-based monomer units having no aromatic ring include, as corresponding monomers, vinyl cyanide-based monomers such as acrylonitrile, methacrylonitrile, and ethacrylonitrile; allyl glycidyl ether; maleic anhydride, and itaconic anhydride; N-methyl maleimide, N-ethylmaleimide, N-cyclohexyl maleimide, acrylamide, methacrylamide, N-methyl acrylamide, butoxy methyl acrylamide, and N-propyl methacrylamide; aminoethyl acrylate, propyl aminoethyl acrylate, dimethylaminoethyl methacrylate, ethyl aminopropyl methacrylate, and cyclohexyl aminoethyl methacrylate; N-vinyl diethylamine, N-acetyl vinyl amine, allyl amine, methallyl amine, and N-methyl allyl amine; 2-isopropenyl-oxazoline, 2-vinyl-oxazoline, 2-acryloyl-oxazoline, and the like. The vinyl-based monomer may be singly used, or two or more vinyl-based monomers may be jointly used.

The content of the other vinyl-based monomer units having no aromatic ring in the acryl-based thermoplastic copolymer is preferably 35 mass % or less.

Since the vinyl-based monomer unit having an aromatic ring (N-phenylmaleimide, phenyl aminoethyl methacrylate, p-glycidyl styrene, p-amino styrene, 2-styryl-oxazoline, or the like) tends to degrade scratch resistance and weather resistance, the content thereof in the acryl-based thermoplastic copolymer is preferably kept at 1 mass % or less.

(Glutarimide-Based Resin)

Examples of the thermoplastic resin that can be used in the present invention include glutarimide-based resins. The glutarimide-based resins represent polymer resins having a glutarimide unit.

The glutarimide-based resin is a thermoplastic resin having a substituted or unsubstituted imide group at a side chain. When a thermoplastic resin has a substituted or unsubstituted imide group at a side chain, preferable characteristic balance can be developed in terms of optical characteristics, heat resistance, and the like. The glutarimide-based resin preferably contains a glutarimide resin having 20 weight % or more of a glutarimide unit expressed by General Formula (301) described below:

[Chem. 8]

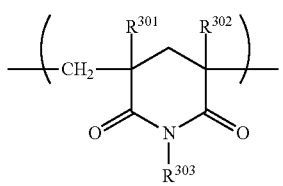

General Formula (301)

(here, in the formula, each of $R^{301}$, $R^{302}$, and $R^{303}$ independently represents hydrogen or a unsubstituted or substituted alkyl group having 1 to 12 carbon atoms, a cycloalkyl group, or an aryl group).

In a preferable glutarimide unit constituting the glutarimide-based resin used in the present invention, each of $R^{301}$ and $R^{302}$ is hydrogen or a methyl group, and $R^{303}$ is a methyl group or a cyclohexyl group. The glutarimide unit may be a single kind, or may include multiple kinds having different $R^{301}$, $R^{302}$, and $R^{303}$.

A preferable second constituting unit constituting the glutarimide-based resin used in the present invention is a unit made of acrylic acid ester or methacrylic acid ester. Examples of the preferable acrylic acid ester or methacrylic acid ester constituting unit include methyl acrylate, ethyl acrylate, methyl methacrylate, ethyl methacrylate, and the like. In addition, examples of another preferable imidizable unit include N-alkyl methacrylamide such as N-methyl methacrylamide and N-ethyl methacrylamide. The second constituting unit may be a single kind, or may include multiple kinds.

The content of the glutarimide unit expressed by General Formula (301) in the glutarimide-based resin is 20 weight % or more on the basis of the total repeating unit of the glutarimide-based resin. The content of the glutarimide unit is preferably in a range of 20 weight % to 95 weight %, more preferably in a range of 50 weight % to 90 weight %, and still more preferably in a range of 60 weight % to 80 weight %. In a case in which the content of the glutarimide unit is below the above-described range, there are cases in which the heat resistance of the obtained film is insufficient, or the transparency is impaired. In addition, when the content of the glutarimide unit is above the above-described range, the heat resistance improves more than necessary and thus it becomes difficult to form a film, and furthermore, the mechanical strength of the obtained film becomes extremely brittle, and there are cases in which the transparency is impaired.

In the glutarimide-based resin, as necessary, a third constituting unit may be copolymerized. As an example of the preferable third constituting unit, it is possible to use a constituting unit obtained by copolymerizing a styrene-based monomer such as styrene, substituted styrene, or a-methyl styrene, an acryl-based monomer such as butyl acrylate, a nitrile-based monomer such as acrylonitrile or methacrylonitrile, or a maleimide-based monomer such as maleimide, N-methyl maleimide, N-phenyl maleimide, or N-cyclohexyl maleimide. The third constituting unit may be directly copolymerized with the glutarimide unit and the imidizable unit in the glutarimide-based resin, or may be graft-copolymerized with a resin having the glutarimide unit and the imidazable unit. In a case in which the third component is added, the content of the third component in the glutarimide-based resin is preferably 5 mol % or more and 30 mol % or less on the basis of the total repeating units in the glutarimide-based resin.

The glutarimide-based resin is described in U.S. Pat. No. 3,284,425A, U.S. Pat. No. 4,246,374A, JP1990-153904A (JP-H02-153904A), and the like, and can be obtained by using a resin obtained from methacrylic acid methyl ester or the like as a resin having the imidazable unit as a main raw material and imidizing the resin having the imidizable unit using ammonia or a substituted amine. When the glutarimide-based resin is obtained, there are cases in which a unit constituted of acrylic acid, methacrylic acid, or an anhydride thereof is introduced into the glutarimide-based resin as a reaction byproduct. The presence of the above-described constitution unit, particularly, an acid anhydride degrades the total light transmissivity or haze of the obtained film of the present invention, which is not preferable. It is desirable to set the content of acrylic acid or methacrylic acid to, per 1 g of the resin, 0.5 milliequivalent or less, preferably 0.3 milliequivalent or less, and more preferably 0.1 milliequivalent or less. In addition, as described in JP1990-153904A (JP-H02-153904A), when the resin is imidized mainly using a resin made up of N-methylacrylamide and methacrylic acid methyl ester, it is also possible to obtain a glutarimide-based resin.

In terms of holding strong elongation characteristics or heat resistance, the weight average molecular weight of the glutarimide-based resin is preferably 10000 or more, and still more preferably 50000 or more. The upper limit of the weight average molecular weight is not particularly limited, but is preferably less than 500000 from the viewpoint of the stretching tension not excessively increasing.

(Other Thermoplastic Resins)

The thermoplastic resin that can be used in the present invention may include thermoplastic resins other than the above-described resins. The kinds of the other thermoplastic resins are not particularly questioned as long as the purpose of the present invention is not impaired, but thermoplastic resins that are thermodynamically compatible are preferred since the mechanical strength or desired properties are improved.

Examples of the other thermoplastic resins include olefin-based thermoplastic resins such as polyethylene, polypropylene, ethylene-propylene copolymers, and poly(4-methyl-1-pentene); halogen-containing thermoplastic resins such as vinyl chloride and chlorinated vinyl resins; acryl-based thermoplastic resins such as polymethyl methacrylate; styrene-based thermoplastic resins such as polystyrene, styrene-methyl methacrylate copolymers, styrene-acrylonitrile copolymers (CEVIAN N series manufactured by Daicel Polymer Ltd.), and acrylonitrile-butadiene-styrene block copolymers; polyesters such as polyethylene terephthalate, polybutylene terephthalate, and polyethylene naphthalate; polyamides such as nylon 6, nylon 66, and nylon 610; polyacetal; polycarbonate; polyphenylene oxides; polyphenylene sulfide; polyether ether ketone; polysulfone; polyether sulfone; polyoxy benzylene; polyamideimide; rubber polymers such as ABS resins and ASA resins into which polybutadiene-based rubber or acryl-based rubber is incorporated; and the like. The rubber polymer preferably has a graft section with a composition that is compatible with a lactone ring polymer that can be used in the present invention on the surface, and the average particular diameter of the rubber polymer is preferably 100 nm or less, and more preferably 70 nm or less from the viewpoint of improving transparency when made into a film shape.

It is preferable to use a copolymer having a vinyl cyanide-based monomer unit and an aromatic vinyl-based monomer unit, specifically, an acrylonitrile-styrene-based copolymer, a polyvinyl chloride resin, or a polymer containing 50 weight % or more of methacrylic acid ester. Among them, when the acrylonitrile-styrene-based copolymer is used, it becomes possible to easily obtain a film having a glass transition temperature of 120° C. or higher, a phase difference per 100 μm in the surface direction of 20 nm or less, and a total light transmissivity of 85% or more.

<Moisture Permeability-Reducing Compound>

To reduce the permeation and desorption of moisture, the optical film of the present invention includes a moisture permeability-reducing compound having a molecular weight of 200 or more and satisfying Formula (1) described below.

$$A/B \leq 0.9 \quad \text{Formula (1)}$$

(In Formula (1), A represents a moisture permeability of an optical film in a case in which 10 mass % of the moisture permeability-reducing compound is added to the mass of the thermoplastic resin, and B represents a moisture permeability of an optical film in a case in which the thermoplastic resin is included and the moisture permeability-reducing compound is not added. Here, the moisture permeability is a moisture permeability in terms of a film thickness of 40 μm of the optical film after 24 hours at 40° C. under a relative humidity of 90% using a method of JIS Z-0208.)

The moisture permeability-reducing compound preferably has A/B of 0.8 or less, and more preferably has A/B of 0.7 or less. When the thermoplastic resin in the optical film of the present invention is an acryl resin or a norbornene-based resin, A/B is still more preferably 0.60 or less. When the thermoplastic resin in the optical film of the present invention is a norbornene-based resin, A/B is still more preferably 0.5 or less.

The moisture permeability-reducing compound may have a structure having one or more aromatic rings. The aromatic rings are capable of imparting a hydrophobic property to the film, and thus it is possible to suppress the permeation and desorption of moisture.

The moisture permeability-reducing compound more preferably has a structure having three or more aromatic rings.

The moisture permeability-reducing compound preferably has one or more —OH groups, and more preferably has three or more aromatic rings and one or more —OH groups.

The moisture permeability-reducing compound is preferably a compound expressed by General Formula (B), the phenolic resin, the terpene resin, the aromatic hydrocarbon formaldehyde resin, the barbituric acid, or phosphoric acid ester, and more preferably a compound expressed by General Formula (B), the phenolic resin, the terpene resin, the aromatic hydrocarbon formaldehyde resin, or the barbituric acid. The moisture permeability-reducing compound is particularly preferably a novolac-type phenolic resin, a hydrogenated terpene resin, a xylene resin, or barbituric acid.

From the viewpoint of reducing the moisture permeability of the optical film of the present invention and improving black display unevenness after the optical film is aged in a high temperature and humidity environment when the optical film of the present invention is combined into a liquid crystal display apparatus, the phenolic resin, the terpene resin, or the aromatic hydrocarbon formaldehyde resin are more particularly preferred, and from the viewpoint of further improving black display unevenness after the optical film is aged in a high temperature and humidity environment when the optical film of the present invention is combined into a liquid crystal display apparatus, the phenolic resin (among them, the novolac-type phenolic resin is preferred) or the aromatic hydrocarbon formaldehyde resin (among them, the xylene resin is preferred) is still more particularly preferred.

Among the respective moisture permeability-reducing compounds, moisture permeability-reducing compounds having a structure having one or more aromatic rings are preferred, and moisture permeability-reducing compounds having a structure having three or more aromatic rings are more preferred.

The moisture permeability-reducing compound is more preferably a compound expressed by General Formula (C) described below.

[Chem. 9]

General Formula (C)

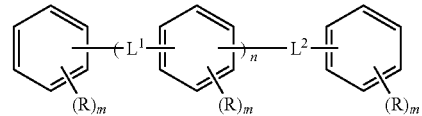

[In General Formula (C), n represents 1 to 10, each of ms independently represents an integer of 1 to 4, each of Rs independently represents a hydrogen atom, a —OH group, or an alkyl group having 1 to 10 carbon atoms which may have a substituent, and each of $L^1$ and $L^2$ independently represents a methylene group or —$CH_2$—O—$CH_2$—. Here, at least one of Rs represents a group having a —OH group.]

In General Formula (C), n is preferably 1 to 7.

In General Formula (C), m is preferably 1 to 3, and more preferably 1 or 2.

In General Formula (C), each of Rs is preferably independently a hydrogen atom, a methyl group or ethyl which may have a —OH group or a substituent. In General Formula (C), the substituent which may be included in the alkyl group represented by R is not particularly limited, but is preferably a —OH group.

In General Formula (C), at least one of the Rs represents a group having a —OH group, and a benzene ring at the molecular terminal preferably has a group including at least one —OH group.

The moisture permeability-reducing compound expressed by General Formula (C) is preferably a compound satisfying General Formula (C) among phenolic resins and aromatic hydrocarbon formaldehyde resins described below.

As the moisture permeability-reducing compound, petroleum resins, terpene resins, terpene phenolic resins, rosin-based resins, coumarone resins, resins for which formaldehyde is used as a raw material (phenol-based resins such as phenol formaldehyde resins and derivatives thereof, aromatic hydrocarbon-formaldehyde resins and derivatives thereof, and the like), and hydrides thereof can also be preferably used.

(Phenol-Based Resins)

The phenol-based resin used in the present invention is preferably a novolac-type phenolic resin.

The novolac-type phenol resin used in the present invention is an ordinary novolac-type phenolic resin obtained by, generally, reacting phenol and formaldehyde (formalin) in the presence of an acidic catalyst such as oxalic acid. The raw material of the phenol is not particularly limited, and for example, phenol, o-cresol, m-cresol, p-cresol, p-tert-butylphenol, p-tert-octylphenol, p-octylphenol, p-nonylphenol, and mixtures thereof can be used. The raw material of the phenol is preferably p-cresol.

In addition, as the raw material of formaldehyde, formalin, paraformaldehyde, acetals, and mixtures of thereof can be used.

The structure of the novolac-type phenolic resin is expressed by General Formula (1) described below.

[Chem. 10]

General Formula (1)

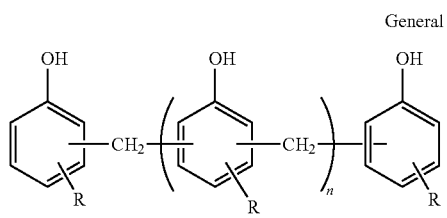

[In General Formula (1), n represents 1 to 10 on the average, and each of Rs independently represents a hydrogen atom or an alkyl group having 1 to 10 carbon atoms.]

In General Formula (1), R represents a hydrogen atom or an alkyl group having 1 to 10 carbon atoms, and among them, is preferably an alkyl group having 1 to 10 carbon atoms from the viewpoint of durability, and more preferably a methyl group.

In General Formula (1), the position of R substituted into each benzene ring in R is not particularly limited, but is preferably a para position with respect to the —OH group.

In General Formula (1), n is preferably 1 to 7.

In General Formula (1), the bonding position of the methylene group coupling the respective benzene rings is not particularly limited, but is preferably a ortho position with respect to the —OH group.

Hereinafter, specific examples of the novolac-type phenolic resin expressed by General Formula (1) will be described, but the present invention is not limited thereto. In addition, n in the following specific examples is identical to n in General Formula (1). Among the following specific examples, A-4 is preferred.

[Chem. 11]

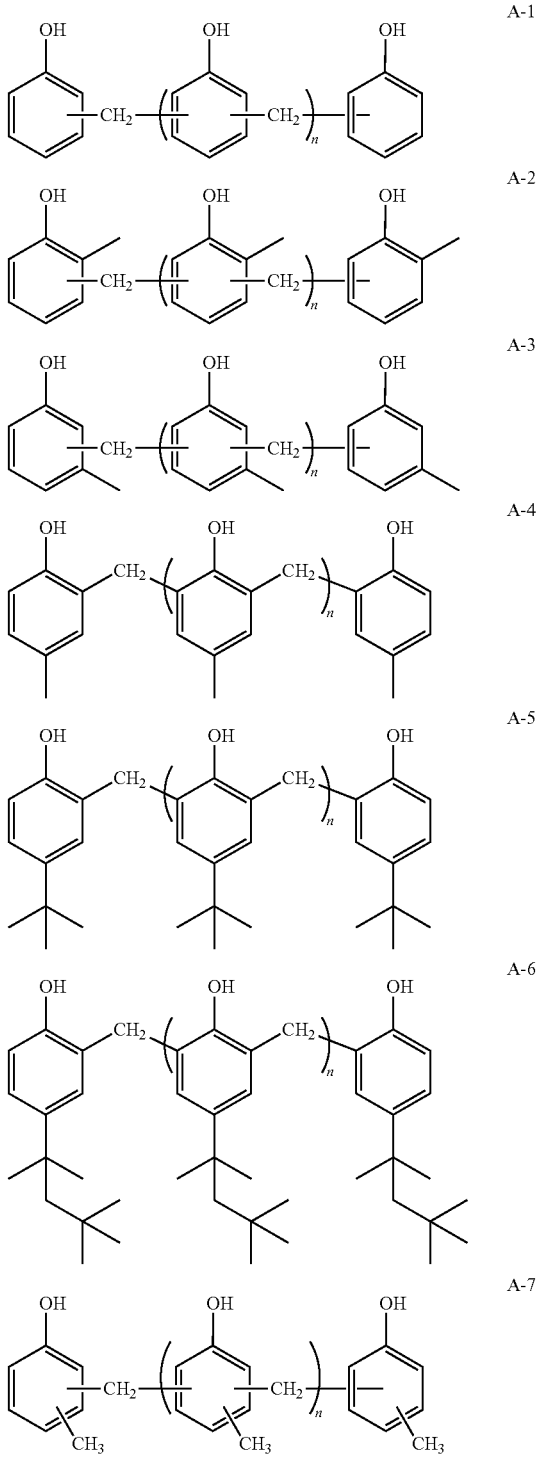

As the novolac-type phenolic resin, it is possible to preferably use a phenolic resin manufactured by Sumitomo Bakelite Co., Ltd. (SUMILITERESIN PR-HF-3 or the like).

The weight average molecular weight of the novolac-type phenolic resin is preferably in a range of 200 to 10000, more preferably in a range of 200 to 5000, and particularly preferably in a range of 200 to 3000.

(Aromatic Hydrocarbon Formaldehyde Resin)

As the aromatic hydrocarbon formaldehyde resin used in the present invention, it is possible to use an ordinary aromatic hydrocarbon formaldehyde resin obtained by, generally, reacting aromatic hydrocarbons and formaldehyde (formalin). The raw material of the aromatic hydrocarbon is not particularly limited, and it is possible to use, for example, three isomers of toluene or xylene, mesitylene, a monocyclic aromatic hydrocarbon compound having 10 or more carbon atoms, and mixtures thereof. Among the aromatic hydrocarbons, xylene is preferred, and m-xylene is more preferred.

In addition, as the raw material of formaldehyde, it is possible to use formalin, paraformaldehyde, acetal, and mixtures thereof.

In General Formula (2), the positions of Rs substituted into the respective benzene rings in Rs are not particularly limited.

In General Formula (2), n is preferably 1 to 7.

In General Formula (2), the bonding positions of the methylene groups or the —CH$_2$O— group which are coupled to the respective benzene rings are not particularly limited, but preferably have a meta position relationship with each other.

Hereinafter, specific examples of the aromatic hydrocarbon formaldehyde resin expressed by General Formula (2) will be described, but the present invention is not limited thereto. In addition, n is identical to n in General Formula (2).

[Chem. 13]

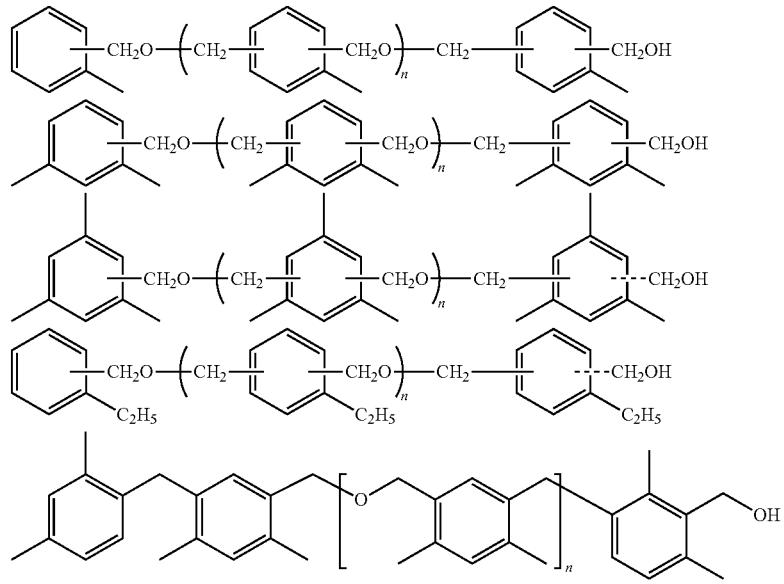

The structure of the aromatic hydrocarbon formaldehyde resin is preferably expressed by General Formula (2) described below.

[Chem. 12]

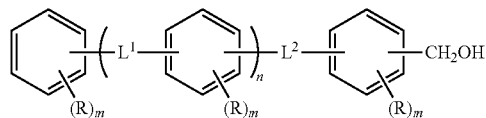

General Formula (2)

[In General Formula (2), n represents 1 to 10 on the average, each of ms independently represents an integer of 1 to 3, each of Rs independently represents a methyl group or an ethyl group, and each of L$^1$ and L$^2$ independently represents a methylene group or —CH$_2$—O—CH$_2$—.]

In General Formula (2), R is preferably a methyl group.

In General Formula (2), the number of Rs substituted into the respective benzene rings in Rs is not particularly limited, but is preferably in a range of 0 to 2, and more preferably 2.

As the aromatic hydrocarbon formaldehyde resin, it is possible to preferably use a xylene resin manufactured by Fudow Co., Ltd. (NIKANOL Y1000 or the like).

The molecular weight of the aromatic hydrocarbon formaldehyde resin is preferably in a range of 200 to 10000, more preferably in a range of 200 to 5000, and particularly preferably in a range of 200 to 3000.

The aromatic hydrocarbon formaldehyde resin can be preferably used when the thermoplastic resin in the optical film of the present invention is a norbornene-based resin.

(Terpene Resin)

The terpene resin used in the present invention is preferably a hydrogenated terpene resin.

The hydrogenated terpene resin used in the present invention refers to a compound obtained by, generally, partially hydrogenating a terpene resin obtained through the cationic polymerization of a terpene compound in the presence of a Friedel-Crafts catalyst. Examples of the terpene compound include α-pinene, β-pinene, dipentene, d-limonene, myrcene, alloocimene, ocimene, α-phellandrene, α-terpinene, γ-terpinene, terpinolene, 1,8-cineole, 1,4-cineole, α-terpineol, β-terpineol, γ-terpineol, sabinene, para-menthadienes, carenes and the like, and α-pinene, β-pinene, dipentene, and d-limonene are preferably used. Furthermore, as the raw material, in addition to the terpene compound, it is possible to use the terpene compound and an aromatic compound, the terpene compound and a phenol-based compound.

As the hydrogenated terpene resin, it is possible to preferably use a hydrogenated terpene resin (CLEARON P150, CLEARON P135, CLEARON P125, CLEARON 115, CLEARON P105, or CLEARON P85) or an aromatic modified hydrogenated terpene resin (CLEARON M125, CLEARON M115, and CLEARON M105) which is manufactured by Yasuhara Chemical Co., Ltd.

As the moisture permeability-reducing compound included in the optical film of the present invention, it is possible to preferably use a compound represented by General Formula (B) described below.

[Chem. 14]

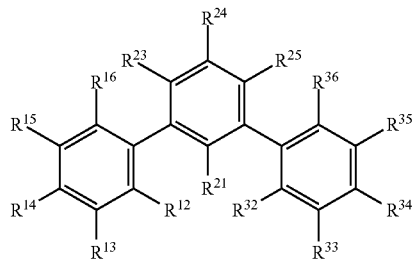

General Formula (B)

In General Formula (B), each of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ independently represents a hydrogen atom or a substituent, and a substituent T described below can be applied as the substituent. Furthermore, at least one of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ in General Formula (B) is an amino group, an acylamino group, an alkoxycarbonylamino group, an aryloxycarbonylamino group, a sulfonylamino group, a hydroxyl group, a mercapto group, or a carboxyl group.

Examples of the substituent T include an alkyl group (preferably having 1 to 20 carbon atoms, more preferably having 1 to 12 carbon atoms, and particularly preferably having 1 to 8 carbon atoms; examples thereof include a methyl group, an ethyl group, an isopropyl group, a tert-butyl group, an n-octyl group, an n-decyl group, an n-hexadecyl group, a cyclopropyl group, a cyclopentyl group, a cyclohexyl group, and the like), an alkenyl group (preferably having 2 to 20 carbon atoms, more preferably having 2 to 12 carbon atoms, and particularly preferably having 2 to 8 carbon atoms; examples thereof include a vinyl group, an allyl group, a 2-butenyl group, a 3-pentenyl group, and the like), an alkynyl group (preferably having 2 to 20 carbon atoms, more preferably having 2 to 12 carbon atoms, and particularly preferably having 2 to 8 carbon atoms; examples thereof include a propargyl group, a 3-pentynyl group, and the like), an aryl group (preferably having 6 to 30 carbon atoms, more preferably having 6 to 20 carbon atoms, and particularly preferably having 6 to 12 carbon atoms; examples thereof include a phenyl group, a p-methylphenyl group, a naphthyl group, and the like), an amino group (preferably having 0 to 20 carbon atoms, more preferably having 0 to 10 carbon atoms, and particularly preferably having 0 to 6 carbon atoms; examples thereof include an amino group, a methylamino group, a dimethylamino group, a diethylamino group, a dibenzylamino group, and the like), an alkoxy group (preferably having 1 to 20 carbon atoms, more preferably having 1 to 12 carbon atoms, and particularly preferably having 1 to 8 carbon atoms; examples thereof include a methoxy group, an ethoxy group, a butoxy group, and the like), an aryloxy group (preferably having 6 to 20 carbon atoms, more preferably having 6 to 16 carbon atoms, and particularly preferably having 6 to 12 carbon atoms; examples thereof include a phenyloxy group, a 2-naphthyloxy group, and the like), an acyl group (preferably having 1 to 20 carbon atoms, more preferably having 1 to 16 carbon atoms, particularly preferably having 1 to 12 carbon atoms; examples thereof include an acetyl group, a benzoyl group, a formyl group, a pivaloyl group, and the like), an alkoxycarbonyl group (preferably having 2 to 20 carbon atoms, more preferably having 2 to 16 carbon atoms, and particularly preferably having 2 to 12 carbon atoms; examples thereof include a methoxycarbonyl group, an ethoxycarbonyl group, and the like), an aryloxy carbonyl group (preferably having 7 to 20 carbon atoms, more preferably having 7 to 16 carbon atoms, and particularly preferably having 7 to 10 carbon atoms; examples thereof include a phenyloxycarbonyl group and the like), an acyloxy group (preferably having 2 to 20 carbon atoms, more preferably having 2 to 16 carbon atoms, and particularly preferably having 2 to 10 carbon atoms; examples thereof include an acetoxy group, a benzoyloxy group, and the like), an acylamino group (preferably having 2 to 20 carbon atoms, more preferably having 2 to 16 carbon atoms, and particularly preferably having 2 to 10 carbon atoms; examples thereof include an acetylamino group, a benzoylamino group, and the like), an alkoxycarbonyl amino group (preferably having 2 to 20 carbon atoms, more preferably having 2 to 16 carbon atoms, and particularly preferably having 2 to 12 carbon atoms; examples thereof include a methoxycarbonylamino group and the like), an aryloxycarbonylamino group (preferably having 7 to 20 carbon atoms, more preferably having 7 to 16 carbon atoms, and particularly preferably having 7 to 12 carbon atoms; examples thereof include a phenyloxycarbonyl amino group and the like), a sulfonylamino group (preferably having 1 to 20 carbon atoms, more preferably having 1 to 16 carbon atoms, and particularly preferably having 1 to 12 carbon atoms; examples thereof include a methanesulfonylamino group, a benzenesulfonylamino group, and the like), a sulfamoyl group (preferably having 0 to 20 carbon atoms, more preferably having 0 to 16 carbon atoms, and particularly preferably having 0 to 12 carbon atoms; examples thereof include a sulfamoyl group, a methylsulfamoyl group, a dimethylsulfamoyl group, a phenylsulfamoyl group, and the like), a carbamoyl group (preferably having 1 to 20 carbon atoms, more preferably having 1 to 16 carbon atoms, and particularly preferably having 1 to 12 carbon atoms; examples thereof include a carbamoyl group, a methylcarbamoyl group, a diethylcarbamoyl group, a phenylcarbamoyl group, and the like), an alkylthio group (preferably having 1 to 20 carbon atoms, more preferably having 1 to 16 carbon atoms, and particularly preferably having 1 to 12 carbon atoms; examples thereof include a methylthio group, an ethylthio group, and the like), an arylthio group (preferably having 6 to 20 carbon atoms, more preferably having 6 to 16 carbon atoms, and particularly preferably having 6 to 12 carbon atoms; examples thereof include a phenylthio group and the like), a sulfonyl group (preferably having 1 to 20 carbon atoms, more preferably having 1 to 16 carbon atoms, and particularly preferably having 1 to 12 carbon atoms; examples thereof include a mesyl group, a tosyl group, and the like), a sulfinyl group (preferably having 1 to 20 carbon atoms, more preferably having 1 to 16 carbon atoms, and particularly preferably having 1 to 12 carbon atoms; examples thereof include a methanesulfinyl group, a benzenesulfinyl group, and the like), a ureido group (preferably having 1 to 20 carbon atoms, more preferably having 1 to 16 carbon atoms, and particularly preferably having 1 to 12 carbon atoms; examples thereof include a ureido group, a methylureido group, a phenylureido group, and the like), a phosphoric acid amide group (preferably having 1 to 20 carbon atoms, more preferably having 1 to 16 carbon atoms, and particularly preferably having 1 to 12 carbon atoms; examples thereof include a diethyl phosphoric acid amide group, a phenyl phosphoric acid amide group, and the like), a hydroxy group, a mercapto group, a halogen atom (for example, a fluorine atom, a chlorine atom, a bromine atom, or an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms and more preferably having 1 to 12 carbon atoms; examples of the hetero atom include a nitrogen atom, an oxygen atom, a sulfur atom, and specific examples include an imidazolyl group, a pyridyl group, a quinolyl group, a furyl group, a piperidyl group, a morpholino group, a benzoxazolyl group, a benzimidazolyl group, a benzthiazolyl group, and the like), a silyl group (preferably having 3 to 40 carbon atoms, more preferably having 3 to 30 carbon atoms, particularly preferably having 3 to 24 carbon atoms; examples thereof include a trimethylsilyl group, a triphenylsilyl group, and the like), and the like. Among them, an alkyl group, an aryl group, a substituted or unsubstituted amino group, alkoxy group, and an aryloxy group are more preferred, and an alkyl group, an aryl group, and alkoxy group are still more preferred.

These substituents may be further substituted by the substituent T. In addition, in a case in which two or more substituents are present, the substituents may be identical or different. In addition, if possible, the substituents may be coupled to each other so as to form a ring.

In General Formula (B), at least one of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ is an amino group, an acylamino group, an alkoxycarbonylamino group, an aryloxycarbonylamino group, a sulfonylamino group, a hydroxyl group, a mercapto group, or a carboxyl group, more preferably an amino group or a hydroxyl group, and particularly preferably a hydroxyl group. In addition, these groups may be substituted by a substituent. In this case, the above-described substituent T can be applied as the substituent, and a preferable range is also identical.

Hereinafter, preferable examples of the compound expressed by General Formula (B) of the present invention will be described, but the present invention is not limited to the specific examples.

[Chem. 15]

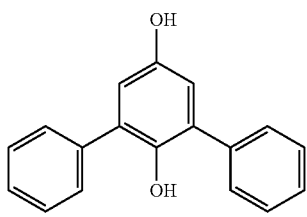

B-1

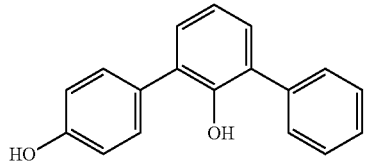

B-2

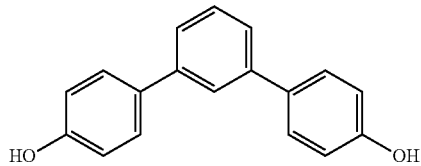

B-3

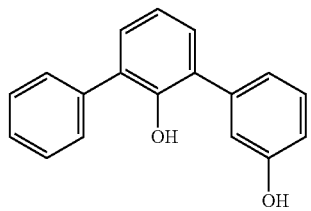

B-4

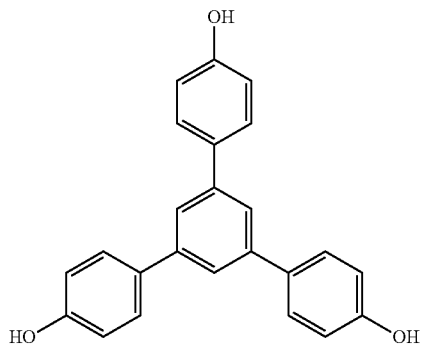

B-5

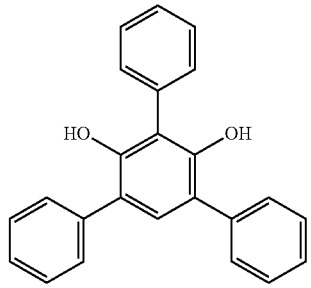

B-6

[Chem. 16]

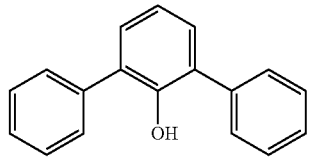

B-7

(Barbituric Acids)

As the moisture permeability-reducing compound, it is also possible to use barbituric acids.

As the barbituric acid used in the present invention, it is possible to use a compound expressed by General Formula (3) described below.

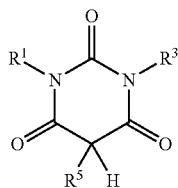

General Formula (3)

In General Formula (3), each of $R^1$, $R^3$, and $R^5$ represents a hydrogen atom, an alkyl group having 1 to 20 carbon atoms, a cycloalkyl group having 3 to 20 carbon atoms, an alkenyl group having 2 to 20 carbon atoms, or an aromatic group having 6 to 20 carbon atoms.

In General Formula (3), the alkyl group having 1 to 20 carbon atoms that can be employed as $R^1$, $R^3$, and $R^5$ preferably has 1 to 10 carbon atoms, more preferably has 1 to 5 carbon atoms, and still more preferably has 1 to 3 carbon atoms, and is still more preferably a methyl group or an ethyl group.

In General Formula (3), the cycloalkyl group having 3 to 20 carbon atoms that can be employed as $R^1$, $R^3$, and $R^5$ preferably has 3 to 10 carbon atoms, and more preferably has 4 to 8 carbon atoms. Specific examples of the cycloalkyl group include a cyclopropyl group, a cyclopentyl group, and a cyclohexyl group, and a cyclohexyl group is particularly preferred.

In General Formula (3), the alkenyl group having 2 to 20 carbon atoms that can be employed as $R^1$, $R^3$, and $R^5$ preferably has 2 to 10 carbon atoms, and more preferably has 2 to 5 carbon atoms.

In General Formula (3), the aromatic group having 6 to 20 carbon atoms that can be employed as $R^1$, $R^3$, and $R^5$ may be an aromatic hydrocarbon group or an aromatic heterocyclic group, but is preferably an aromatic hydrocarbon group. The aromatic hydrocarbon group is preferably a phenyl group or a naphtyl group, and more preferably a phenyl group.

In General Formula (3), $R^1$, $R^3$, and $R^5$ may have a substituent, the substituent is not particularly limited, and examples thereof include an alkyl group (preferably having 1 to 10 carbon atoms; examples thereof include methyl, ethyl, isopropyl, t-butyl, pentyl, heptyl, 1-ethylpentyl, benzyl, 2-ethoxyethyl, 1-carboxymethyl, and the like), an alkenyl group (preferably having 2 to 20 carbon atoms; examples thereof include vinyl, allyl, oleyl, and the like), an alkynyl group (preferably having 2 to 20 carbon atoms; examples thereof include ethynyl, butadiynyl, phenylethynyl, and the like), a cycloalkyl group (preferably having 3 to 20 carbon atoms; examples thereof include cyclopropyl, cyclopentyl, cyclohexyl, 4-methylcyclohexyl, and the like), an aryl group (preferably having 6 to 26 carbon atoms; examples thereof include phenyl, 1-naphthyl, 4-methoxyphenyl, 2-chlorophenyl, 3-methyl phenyl, and the like), a heterocyclic group (preferably a heterocyclic group having 0 to 20 carbon atoms in which a ring-constituting hetero atom is preferably an oxygen atom, a nitrogen atom, or a sulfur atom, a benzene ring or a hetero ring of a five or six-membered ring may be condensed, and the ring may be a saturated ring, an unsaturated ring, or an aromatic ring; examples thereof include 2-pyridyl, 4-pyridyl, 2-imidazolyl, 2-benzimidazolyl, 2-thiazolyl, 2-oxazolyl, and the like), an alkoxy group (preferably having 1 to 20 carbon atoms; examples thereof include methoxy, ethoxy, isopropyloxy, benzyloxy, and the like), an aryloxy group (preferably having 6 to 26 carbon atoms; examples thereof include phenoxy, 1-naphthyloxy, 3-methyl phenoxy, 4-methoxyphenoxy, and the like), an alkylthio group (preferably having 1 to 20 carbon atoms; examples thereof include methylthio, ethylthio, isopropylthio, benzylthio, and the like), an arylthio group (preferably having 6 to 26 carbon atoms; examples thereof include phenylthio, 1-naphthylthio, 3-methylphenylthio, 4-methoxyphenylthio, and the like), an acyl group (in which an alkyl carbonyl group, an alkenyl carbonyl group, an aryl carbonyl group, and a hetero ring carbonyl group are included, and the number of carbon atoms is preferably 20 or less; examples thereof include acetyl, pivaloyl, acryloyl, methacryloyl, benzoyl, nicotinoyl, and the like), an aryloyl alkyl group, an alkoxycarbonyl group (preferably having 2 to 20 carbon atoms; examples thereof include ethoxycarbonyl, 2-ethylhexyloxycarbonyl, and the like), an aryloxycarbonyl group (preferably having 7 to 20 carbon atoms; examples thereof include phenyloxycarbonyl, naphthyloxycarbonyl, and the like), an amino group (in which an amino group, an alkylamino group, an arylamino group, and a heterocyclic amino group are included, and the number of carbon atoms is preferably 0 to 20; examples thereof include amino, N,N-dimethylamino, N,N-diethylamino, N-ethylamino, anilino, 1-pyrrolidinyl, piperidino, morpholinyl, and the like), a sulfonamide group (preferably having 0 to 20 carbon atoms; examples thereof include N,N-dimethylsulfoneamide, N-phenylsulfoneamide, and the like), a sulfamoyl group (preferably having 0 to 20 carbon atoms; examples thereof include N,N-dimethyl sulfamoyl, N-phenylsulfamoyl, and the like), an acyloxy group (preferably having 1 to 20 carbon atoms; examples thereof include acetyloxy, benzoyloxy, and the like), a carbamoyl group (preferably having 1 to 20 carbon atoms; examples thereof include N,N-dimethylcarbamoyl, N-phenylcarbamoyl, and the like), an acylamino group (preferably having 1 to 20 carbon atoms; examples thereof include acetylamino, acryloylamino, benzoylamino, nicotinamide, and the like), a cyano group, a hydroxyl group, a mercapto group, and halogen atoms (for example, a fluorine atom, a chlorine atom, a bromine atom, an iodine atom, and the like).

In General Formula (3), the substituent that can be included in $R^1$, $R^3$, and $R^5$ may further have the above-described substituent.

In General Formula (3), among the substituents that the respective groups of $R^1$, $R^3$, and $R^5$ may have, an alkyl group, an aryl group, an alkoxy group, and an acyl group are preferred.

Among compounds expressed by General Formula (3), preferable compounds can be listed as described below.

Compounds in which any One of $R^1$, $R^3$, and $R^5$ is an Aralkyl Group

The aralkyl group is a compound in which an alkyl group is substituted by an aryl group, and among aralkyl groups, aralkyl groups in which an alkyl group is substituted by one or two aryl groups (in a case in which an alkyl group is substituted by two aryl groups, the aryl groups preferably substitute the same carbon atom) is preferred. Furthermore, aralkyl groups in which an alkyl group is substituted by an aryl group and an acyl group (preferably an aryloyl group) is preferred.

Compounds in which any One of $R^1$, $R^3$, and $R^5$ is a Group Having a Cycloalkyl Group, and the Group Having a Cycloalkyl Group is Preferably a Cycloalkyl Group From the viewpoint of dissolution stability during film formation, in the compound expressed by General Formula (3), each of $R^1$, $R^3$, and $R^5$ is more preferably an alkyl group having 1 to 20 carbon atoms, an alkenyl group having 2 to 20 carbon atoms, or an aryl group having 6 to 20 carbons. In addition, each of $R^1$, $R^3$, and $R^5$ more preferably has one or more ring structures, and each of $R^1$, $R^3$, and $R^5$ still more preferably has one ring structure.

The compound expressed by General Formula (3) is more preferably expressed by General Formula (3-a) described below.

[Chem. 18]

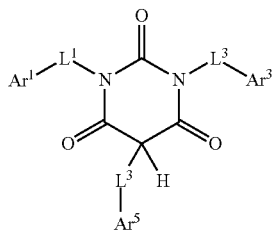

General Formula (3-a)

In General Formula (3-a), each of $L^1$ to $L^3$ represents a single bond or a divalent linking group having one or more carbon atoms. Each of $L^1$ to $L^3$ is more preferably a single bond or an alkylene group having 1 to 6 carbon atoms, still more preferably a single bond, a methylene group, or an ethylene group, and particularly preferably a single bond or a methylene group. When dissolution stability is taken into account, at least one of $L^1$ to $L^3$ is preferably an alkylene group having 1 to 6 carbon atoms, and at least two of $L^1$ to $L^3$ are more preferably alkylene groups having 1 to 6 carbon atoms. At least one of $L^1$ to $L^3$ is preferably a single bond. The divalent linking group that can be represented by $L^1$ to $L^3$ may have a substituent, and the substituent is identical to the substituent that $R^1$, $R^3$, and $R^5$ may have.

In General Formula (3-a), each of $Ar^1$ to $Ar^3$ represents an aryl group having 6 to 20 carbon atoms, and is preferably a phenyl group or a naphthyl group, and more preferably a phenyl group. $Ar^1$ to $Ar^3$ may have a substituent, and the substituent is identical to the substituent that $R^1$, $R^3$, and $R^5$ may have. In a case in which $Ar^1$ to $Ar^3$ do not have any substituent, or $Ar^1$ to $Ar^3$ have a substituent, the substituent preferably has no ring structure.

The molecular weights of the compounds expressed by General Formula (3) and General Formula (3-a) are preferably in a range of 250 to 1200, more preferably in a range of 300 to 800, and particularly preferably in a range of 350 to 600.

When the molecular weight is too small, there are cases in which sublimation from a film becomes a problem, and when the molecular weight is too great, there are cases in which haze becomes great.

Hereinafter, specific examples of the compounds expressed by General Formula (3) and General Formula (3-a) will be described, but the present invention is not limited thereto. In compounds exemplified below, Me represents a methyl group.

[Chem. 19]

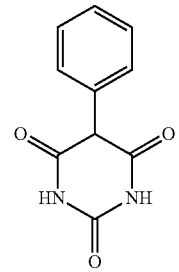

(2-1)

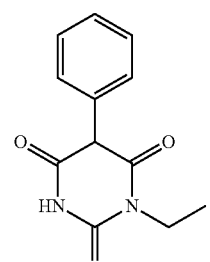

(2-2)

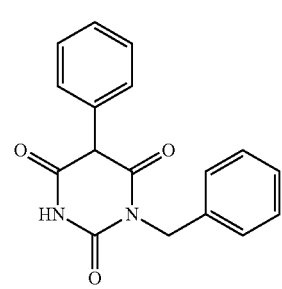

(2-3)

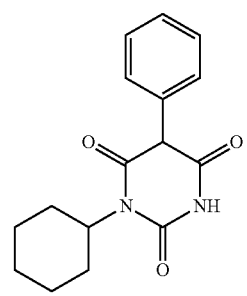

(2-4)

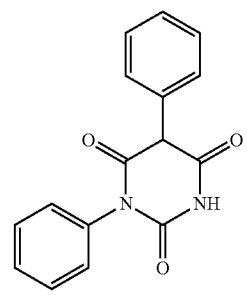

(2-5)

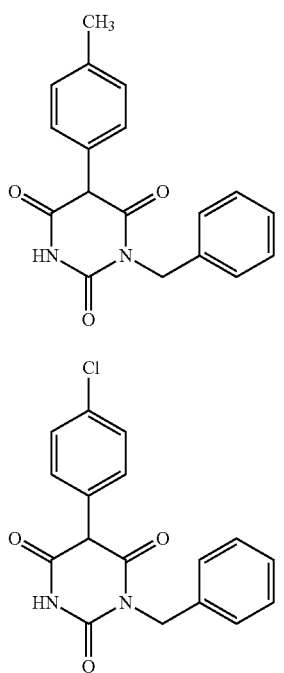
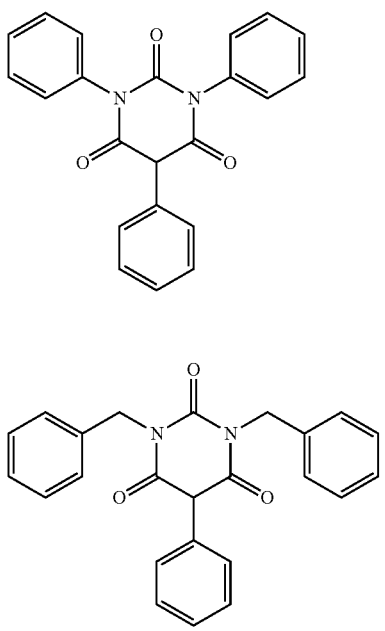
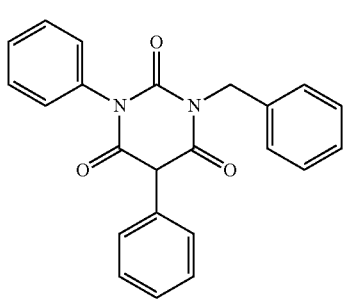
[Chem. 20]
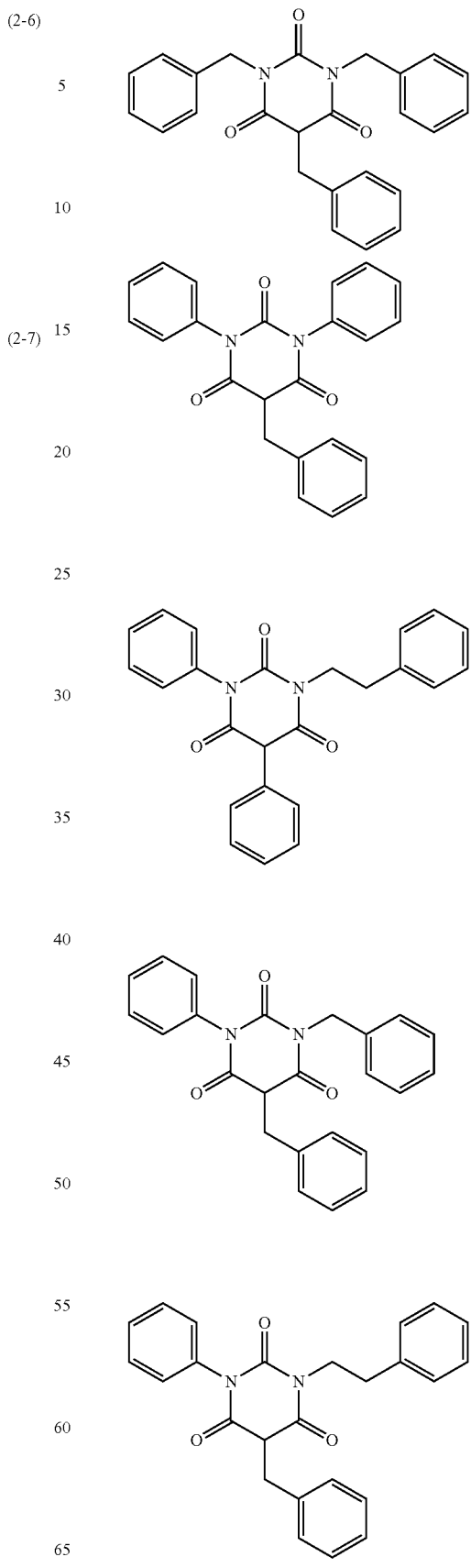

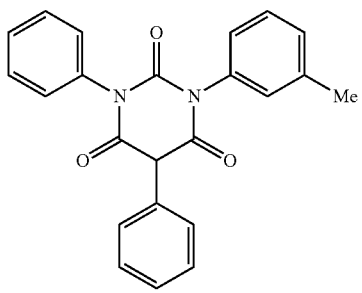
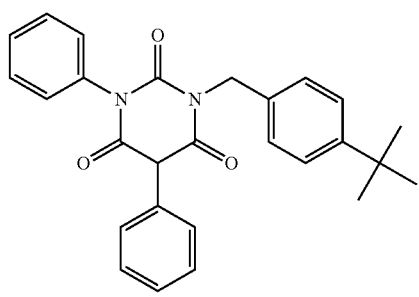
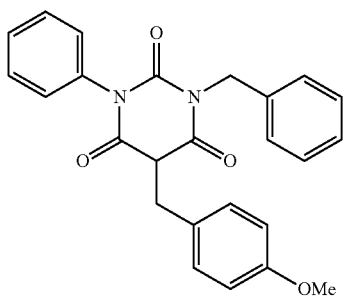
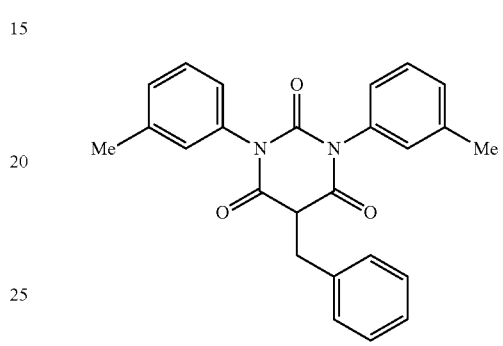
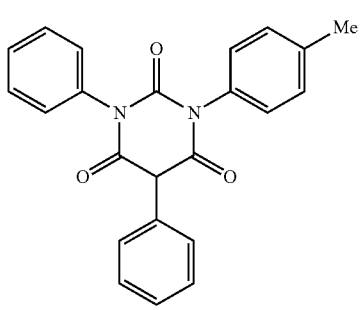
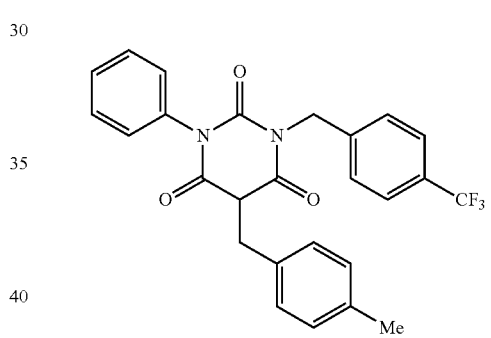
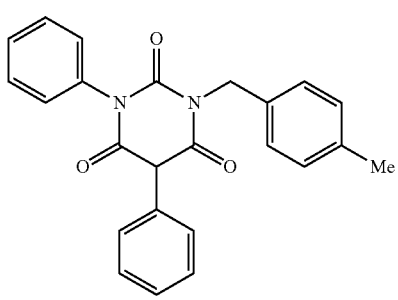
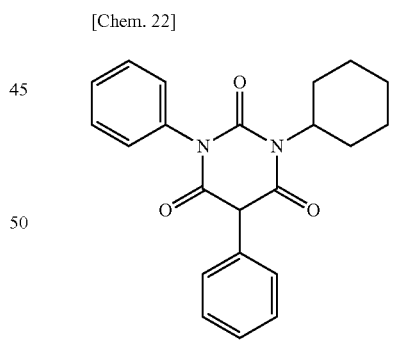
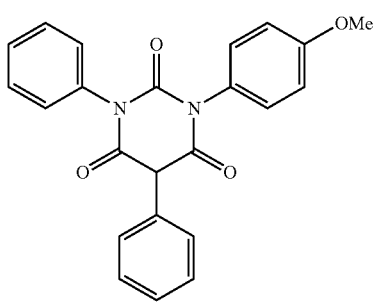
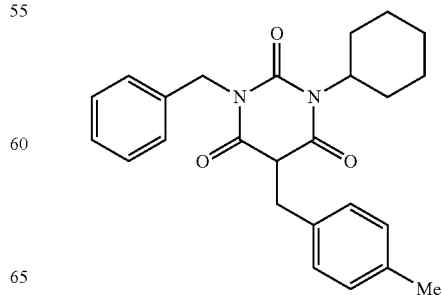

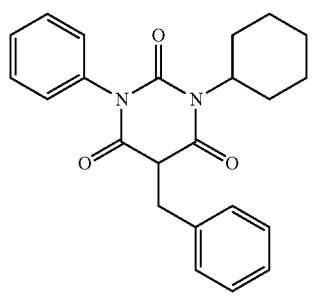
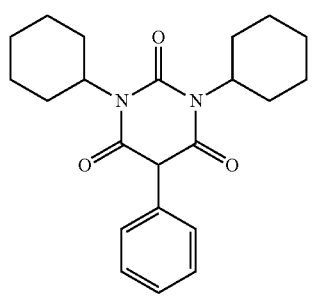
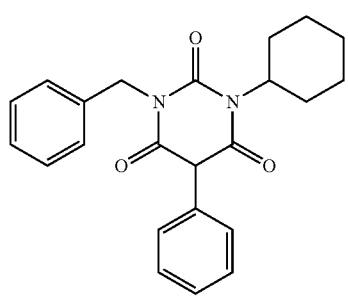
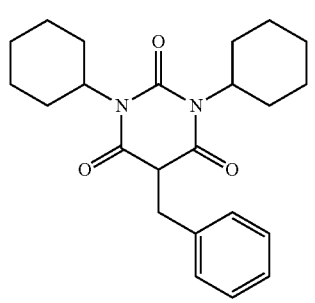
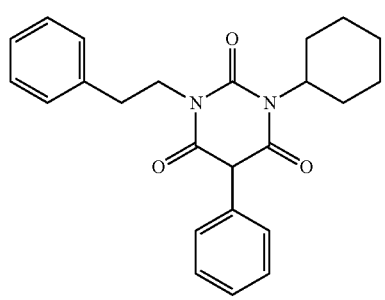
[Chem. 23]
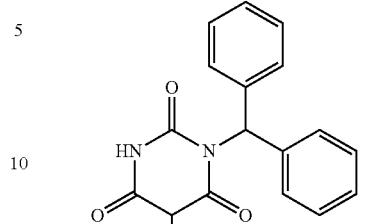
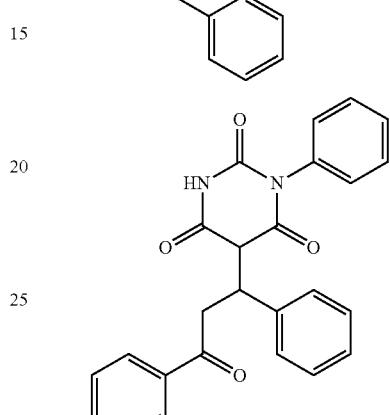
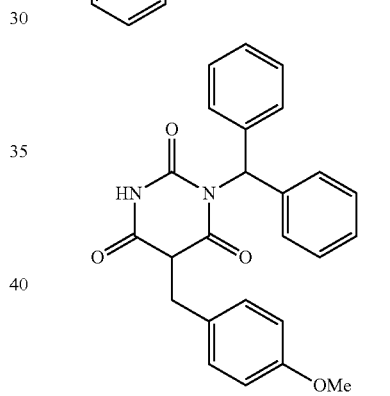
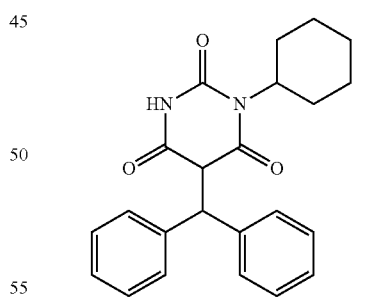
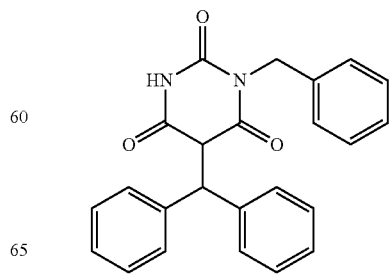

-continued

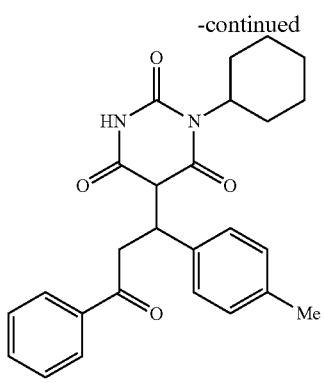

[Chem. 24]

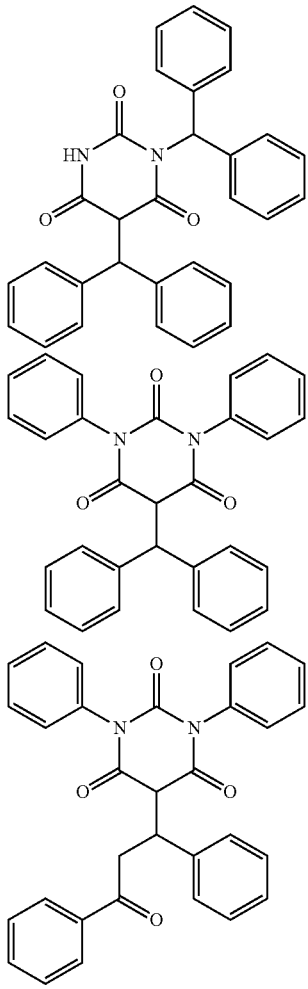

It is known that the compound expressed by General Formula (3) can be synthesized using a synthesis method of barbituric acid which condenses a urea derivative and a malonic acid derivative. Barbituric acid having two substituents on N is obtained either by heating N,N'-disubstituted urea and malonic acid chloride or by heating a combination of malonic acid and an activating agent such as acetic anhydride, and the methods described in, for example, Journal of the American Chemical Society, Vol. 61, pp. 1015 (1939), Journal of Medicinal Chemistry, Vol. 54, pp. 2409 (2011), Tetrahedron Letters, Vol. 40, pp. 8029 (1999), WO2007/150011A, and the like can be preferably used.

The malonic acid used for condensation may be an unsubstituted malonic acid or may have a substituent, and when a malonic acid having a substituent that corresponds to $R^5$ is used, it is possible to synthesize the compound expressed by General Formula (3) of the present invention by building the barbituric acid. In addition, when an unsubstituted malonic acid and a urea derivative are condensed together, barbituric acid having the unsubstituted fifth position is obtained, and therefore it is possible to synthesize the compound expressed by General Formula (3) of the present invention by modifying the unsubstituted barbituric acid.

The synthesis method of the compound expressed by General Formula (3) used in the present invention is not limited to the above-described method.

(Phosphoric Acid Ester)

As the moisture permeability-reducing compound, it is also possible to use phosphoric acid ester.

Examples of the phosphoric acid ester used in the present invention include well-known low-molecular phosphoric acid esters that are used as additives to cellulose acylate films such as triphenyl phosphate (TPP).

The molecular weight of the phosphoric acid ester is preferably in a range of 200 to 1000.

Since the polarity differs depending on the kind of the thermoplastic resin in the optical film of the present invention, it is possible to select the optimal moisture permeability-reducing compound depending on the kind of the thermoplastic resin.

When the thermoplastic resin in the optical film of the present invention is an acryl resin, it is possible to preferably use the compound expressed by General Formula (B) and the phenol resin as the moisture permeability-reducing compound.

When the thermoplastic resin in the optical film of the present invention is a polystyrene resin or a styrene-acrylonitrile resin, as the moisture permeability-reducing compound, it is possible to preferably use the compound expressed by General Formula (B) or the phosphoric acid ester, and the compound expressed by General Formula (B) is more preferably used.

When the thermoplastic resin in the optical film of the present invention is a norbornene-based resin, as the moisture permeability-reducing compound, the compound expressed by General Formula (B), the phenolic resin, the terpene resin, the aromatic hydrocarbon formaldehyde resin, or the barbituric acid is preferably used, the terpene resin, the aromatic hydrocarbon formaldehyde resin or the barbituric acid is more preferably used, the terpene resin or the aromatic hydrocarbon formaldehyde resin is particularly preferably used when the polarity with the thermoplastic resin is taken into account, and the aromatic hydrocarbon formaldehyde resin is more particularly preferably used.

The optical film of the present invention preferably includes the moisture permeability-reducing compound at an amount in a range of 10 mass % to 100 mass % with respect to the mass of the thermoplastic resin. The amount is more preferably in a range of 15 mass % to 90 mass %, and still more preferably in a range of 20 mass % to 80 mass %.

<Other Additives>

(Matting Agent Fine Particles)

To the optical film of the present invention, it is possible to add fine particles as a matting agent. Examples of the fine particles used as a matting agent include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate, and calcium phosphate. The fine particles are preferably fine particles containing silicon since the haze of the film becomes low, and particularly preferably silicon dioxide. The fine particles of silicon dioxide preferably have an average primary particle diameter of 20 nm or less and an apparent specific gravity of 70 g/L or more. The fine particles having an average diameter of the primary particles that is as small as 5 nm to 16 nm are more preferred since the haze of the film can be lowered. The apparent specific gravity is preferably in a range of 90 g/liter to 200 g/liter, and still more preferably in a range of 100 g/liter to 200 g/liter. As the apparent specific gravity increases, it becomes possible to produce a dispersion having a higher concentration, and haze and aggregation are improved, which is preferable.

These fine particles generally form secondary particles having an average particle diameter in a range of 0.1 µm to 3.0 µm, and the fine particles are present in a form of an aggregate of the primary particles in the film, and form 0.1 µm to 3.0 µm protrusions and recesses on the film surface. The average particle diameter of the second particles is preferably 0.2 µm to 1.5 µm, still more preferably 0.4 µm to 1.2 µm, and most preferably 0.6 µm to 1.1 µm. The particle diameters of the primary particles and the secondary particles are obtained by observing the particles in the film using a scanning electron microscope, and obtaining the diameters of circles that come into contact with the outlines of the particles. In addition, 200 particles at different positions are observed, and the average particle diameter is obtained from the average value of the particles.

As the fine particles of silicon dioxide, it is possible to use commercially available products, for example, AEROSIL R972, R972V, R974, R812, 200, 200V, 300, R202, OX50, or TT600 (all manufactured by Nippon Aerosil Co., Ltd.). The fine particles of zirconium oxide are, for example, commercially available under the trade name of AEROSIL R976 and R811 (all manufactured by Nippon Aerosil Co., Ltd.), and the commercially available product can be used.

Among them, AEROSIL 200V and AEROSIL 972V are the fine particles of silicon dioxide having an average particle diameter of primary particles of 20 nm or less and an apparent specific gravity of 70 g/liter or more, and are particularly preferred since these fine particles have a strong effect that decreases the friction coefficient while holding the turbidity of the optical film at a low level.

A solvent used for dispersion is preferably a lower alcohol, and examples thereof include methyl alcohol, ethyl alcohol, propyl alcohol, isopropyl alcohol, butyl alcohol, and the like. There is no particular limitation regarding a solvent other than the lower alcohol, but it is preferable to use a solvent used to form the optical film.

(Other Additives)

In addition to the above-described matting particles, it is possible to add a variety of other additives (for example, a retardation developer, a plasticizer, an ultraviolet absorber, an anti-deterioration agent, a release agent, an infrared absorber, a wavelength dispersion adjuster, and the like) to the optical film of the present invention, and the additives may be solid substances or oily substances. That is, there is no particular limitation regarding the melting point or boiling point of the additives. For example, an ultraviolet absorbing material having a melting point or boiling point of 20° C. or lower and an ultraviolet absorbing material having a melting point or boiling point of 20° C. or higher are mixed together, or plasticizers are mixed together in the same manner, which are described in, for example, JP2001-151901A, and the like. Furthermore, the infrared absorbing dye is described in, for example, JP2001-194522A. Regarding the addition timing, the additives may be added in any phases during a dope production step, and a step of adding the additives so as to prepare the dope may be added to the final preparation step of the dope preparation step. In addition, there is no particular limitation regarding the addition amounts of individual materials as long as the functions are developed. In a case in which the optical film is formed of multiple layers, the kinds or addition amounts of the additives may be different in the respective layers. For examples, as described in JP2001-151902A and the like, what has been described above is techniques that have been thus far known. Regarding the details thereof, the materials described in detail on pp. 16 to 22 in the JIII's published technical report (Publication Number 2001-1745, issued on Mar. 15, 2001, Japan Institute of Invention and Innovation) are preferably used.

The optical film of the present invention may include acryl particles. It is described in JP1985-17406B (JP-S60-17406B), JP1991-39095B (JP-H03-39095B), and the like that impact resistance and stress whitening resistance are improved when the acryl particles, particularly, a multilayer-structured acryl-based granular complex is added.

In a case in which the additives are added to the optical film of the present invention, the total amount of the additives is preferably 50 mass % or less and more preferably 30 mass % or less with respect to the optical film.

<Characteristics of the Optical Film>

(Retardation)

The Re and Rth (defined by Formulae (I) and (II) described below) of the optical film of the present invention, which are measured at a wavelength of 590 nm, satisfy Formulae (III) and (IV).

$$Re=(nx-ny)\times d \quad\text{Formula (I)}$$

$$Rth=\{(nx+ny)/2-nz\}\times d \quad\text{Formula (II)}$$

$$|Re|\leq 50\text{ nm} \quad\text{Formula (III)}$$

$$|Rth|\leq 300\text{ nm} \quad\text{Formula (IV)}$$

(In the formulae, nx represents the refractive index in the slow axis direction in the film plane of the optical film, ny represents the refractive index in the fast axis direction in the optical film plane, nz represents the refractive index in the film thickness direction of the optical film, and d represents the thickness (nm) of the optical film.)

In the optical film of the present invention, Formulae (III) and (IV) need to be satisfied in at least one point in the film plane, and Formulae (III) and (IV) are preferably satisfied in an arbitrary point in the film plane.

Re, Rth, and Nz at a wavelength of λ nm can be measured in the following manner.

Re is measured by radiating light having a wavelength of λ nm in the film normal direction in a KOBRA 21 ADH (manufactured by Oji Scientific Instruments Co., Ltd.).

Rth is computed using the KOBRA 21 ADH on the basis of retardation values measured in a total of three directions which are the Re, a retardation value measured by radiating light having a wavelength of λ nm in a direction +40° inclined to the film normal direction using the slow axis in the plane (determined by the KOBRA 21ADH) as the inclination axis (rotational axis), and a retardation value measured by radiating light having a wavelength of λ nm in a direction −40° inclined to the film normal direction using the slow axis in the plane as the inclination axis (rotational axis). Here, as the assumption value of the average refractive index, it is possible to use values in thermoplastic Handbook (JOHN WILEY & SONS, INC) and a variety of optical film catalogues. For optical films having unknown average refractive index values, the refractive index can be measured using an Abbe refractometer. The average refractive index values of the major optical films will be described below: cellulose acylate (1.48), cyclic polyolefin (1.52), polycarbonate (1.59), polymethyl methacrylate (1.49), and polystyrene (1.59).

Nz is calculated from Formula (VI) on the basis of Re and Rth. It is also possible to compute nx, ny, and nz using the KOBRA 21ADH on the basis of the assumption value of the average refractive index and the film thickness, and compute Nz from the nx, ny, and nz values using Formula (II).

The Re, Rth, and Nz can be adjusted using the addition of the retardation developer, the film thickness of the film, the stretching direction and draw ratio of the film, and the like.

(Thickness of the Film)

The thickness of the optical film of the present invention is preferably 100 µm or less, more preferably 60 µm or less, still more preferably 40 µm or less, and particularly preferably 25 µm or less. When the thickness is 60 µm or less, it is possible to decrease the unevenness of the panel caused by an environment in which the liquid crystal display apparatus is placed, that is, the change in temperature and humidity.

(Moisture Permeability of the Film)

The moisture permeability of the film is measured on the basis of JIS Z-0208 under the conditions of 40° C. under a relative humidity of 90%.

Regarding the moisture permeability, zero point correction is carried out by subtracting the moisture permeability measurement value for which 10 µm-thick aluminum foils are used instead of individual samples from the measurement values of the individual samples, and the moisture permeability of the samples are obtained. In addition, the moisture permeability decreases when the film thickness of the film is thick, and increases when the film thickness is thin. Therefore, for samples having different film thicknesses, it is necessary to do conversion by providing the standard at 40 µm. The conversion of the film thickness can be carried out according to the following equation.

40 µm-converted moisture permeability=actually measured moisture permeability×actually measured film thickness (µm)/40 (µm)     Equation The moisture permeability of the optical film of the present invention is more preferably 70 g/m²/day or less, still more preferably 50 g/m²/day, still far more preferably 40 g/m²/day or less, and more particularly preferably 30 g/m²/day or less.

When the moisture permeability is 70 g/m²/day or less, it is possible to suppress the warpage of a liquid crystal cell or the display unevenness during black display after the liquid crystal display apparatus is aged at normal temperature, a high humidity, and a high temperature and humidity environment.

(Oxygen Permeation Coefficient of the Film)

To reduce the moisture permeability, it is preferable to suppress diffusion of water in the film, that is, to reduce the free volume of the film. Generally, the free volume of the film correlates with the oxygen permeation coefficient of the film.

The oxygen permeation coefficient of the optical film of the present invention is preferably 100 cc·mm/(m²·day·atm) or less, and more preferably 30 cc·mm/(m²·day·atm) or less.

In the case of the solvent casting method, the oxygen permeability coefficient is preferably 5 cc·mm/(m²·day·atm) or more to reduce the load of a drying process.

<Method for Measuring the Oxygen Permeation Coefficient>

The oxygen permeation amount of the film is obtained by attaching a test piece cut into 1.5 cm in diameter through a thinly coated silicon grease to an oxygen electrode (manufactured by Orbisphere Laboratories, MODEL3600, PFA), and measuring the oxygen reduction current output value in a steady state.

The output current value is converted to the oxygen permeation amount by producing a calibration curve using samples having a known permeation amount. The measurement is carried out in an environment of 25° C. under a relative humidity of 50%.

(Knoop Hardness of the Film)

In the polarization plate protective film used on the outermost surface, the surface hardness is preferably high, and, in this case, as a characteristic of the optical film of the present invention, the Knoop hardness is preferably high. The Knoop hardness is preferably 100 N/mm² or more, and more preferably 150 N/mm² or more.

<Measurement of the Surface Hardness>

The surface hardness of a sample fixed to a glass substrate is measured under conditions of a load time of 10 seconds, a creep time of 5 seconds, an unloading time of 10 seconds, and a maximum load of 100 mN using "Fischer Scope H100Vp-type hardness meter" manufactured by Fischer Instruments K.K. and a Knoop indenter in which the orientation of the short axis of the indenter is disposed in parallel with the transport direction (longitudinal direction; the test direction of a pencil hardness test) during the film formation. The hardness is computed from the relationship between the contact area between the indenter and the sample, which is obtained from the indentation depth, and the maximum load, and the average value of the five points is used as the surface hardness.

(Haze of the Film)

The total haze value (the unit of the haze value: %, this shall apply below) of the optical film of the present invention is preferably 2.00 or less. When the total haze value is 2.00 or less, the transparency of the film is high, and an effect that improves the contrast ratio or brightness of the liquid crystal display apparatus is obtained. The total haze value is more preferably 1.00 or lower, still more preferably 0.50 or less, particularly preferably 0.30 or less, and most preferably 0.20 or less. While the optical performance is excellent as the total haze value decreases, when the selection of raw materials, manufacturing management, or the handleability of the roll film are taken into account, the total haze value is preferably 0.01 or more.

The internal haze value of the optical film of the present invention is preferably 1.00 or less. When the internal haze value is set to 1.00 or less, it is possible to improve the contrast ratio of the liquid crystal display apparatus and realize excellent display characteristics. The internal haze value is more preferably 0.50 or lower, still more preferably 0.20 or less, particularly preferably 0.10 or less, and most preferably 0.05 or less. From the viewpoint of the selection of raw materials, manufacturing management, or the like, the internal haze value is preferably 0.01 or more.

The optical film of the present invention particularly preferably has a total haze value of 0.30 or less and an internal haze value of 0.10 or less.

The total haze value and the internal haze value can be adjusted using the kinds and addition amounts of the resin in the film material, the selection of the additives (particularly, the particle diameter of the matting agent particles, the refractive index, and the addition amount), and furthermore, the film production conditions (the temperature during stretching, the stretch ratio, and the like).

The haze can be measured using a 40 mm×80 mm sample of the film of the present invention and a haze meter (HGM-2DP, Suga Test Instruments) at 25° C. under a relative humidity of 60% according to JIS K-6714.

(Elastic Modulus of the Film)

The elastic modulus of the optical film of the present invention is preferably 1800 MPa to 7000 MPa in the width direction (TD direction).

In the present invention, the elastic modulus in the TD direction is preferably set within the above-described range from the viewpoint of manufacturing aptitude such as display unevenness during black display at a high humidity and after aging in a high temperature and humidity environment, the transportation properties during the production of the film, edge slitting properties, and breakage resistance. When the TD elastic modulus is too small, display unevenness during black display at a high humidity and after aging in a high temperature and humidity environment becomes likely to occur, and problems occur with the manufacturing aptitude, and, when the TD elastic modulus is too great, the film workability deteriorates, and therefore the elastic modulus in the TD direction is more preferably in a range of 1800 MPa to 5000 MPa, and still more preferably in a range of 1800 MPa to 4000 MPa.

In addition, the elastic modulus in the transportation direction (MD direction) of the optical film of the present invention is preferably in a range of 1800 MPa to 4000 MPa, and more preferably in a range of 1800 MPa to 3000 MPa.

Here, the transportation direction (longitudinal direction) of the film refers to the transportation direction (MD direction) during the film production, and the width direction refers to a direction (TD direction) perpendicular to the transportation direction during the film production.

The elastic modulus of the film can be adjusted using the kinds and addition amounts of the resin in the film material, the selection of the additives (particularly, the particle diameter of the matting agent particles, the refractive index, and the addition amount), and furthermore, the film production conditions (the stretch ratio, and the like).

The elastic modulus can be obtained by measuring a stress in 0.5% elongation at a tension rate of 10%/minute in an atmosphere of 23° C. under a relative humidity of 70% using, for example, a universal tension tester "STM T50BP" manufactured by Toyo Baldwin Co., Ltd.

(Glass Transition Temperature Tg)

From the viewpoint of manufacturing aptitude and heat resistance, the glass transition temperature Tg of the optical film of the present invention is preferably in a range of 100° C. to 200° C., and still more preferably in a range of 100° C. to 150° C.

In addition, the glass transition temperature can also be obtained using a dynamic viscoelasticity measurement apparatus described below. The humidity of a 5 mm×30 mm (unstretched) film specimen of the present invention is adjusted at 25° C. under a relative humidity of 60% for two hours or longer, and the dynamic viscoelasticity is measured using a dynamic viscoelasticity measuring apparatus (VIBRON: DVA-225 (manufactured by I.T. Keisoku Seigyo K.K.)) at an intergrip distance of 20 mm, a temperature-rise rate of 2° C./min, a measurement temperature range of 30° C. to 250° C., and a frequency of 1 Hz. When the storage elastic modulus is plotted along the vertical axis in a logarithm scale, and the temperature (° C.) is plotted along the horizontal axis in a linear scale, for an abrupt decrease in the storage elastic modulus appearing when the storage elastic modulus transfers from the solid region to a glass transition region, a straight line 1 is drawn in a solid region, and a straight line 2 is drawn in the glass transition region. The intersection point between the straight line 1 and the straight line 2 indicates a temperature at which the storage elastic modulus abruptly decreases during an increase in temperature, the film begins to soften, and the storage elastic modulus begins to transfer to the glass transition region, and thus is considered as the glass transition temperature Tg (dynamic viscoelasticity).

(Equilibrium Water Content of the Film)

Regarding the water content (equilibrium water content) of the optical film of the present invention, the water content at 25° C. under a relative humidity of 80% is preferably in a range of 0 mass % to 4 mass % regardless of the film thickness to prevent the adhesiveness with a water-soluble thermoplastic substance such as polyvinyl alcohol from being impaired when the optical film is used as a protective film of a polarization plate. The water content is more preferably in a range of 0.1 mass % to 2.5 mass %, and still more preferably in a range of 0.5 mass % to 1.5 mass %. The equilibrium water content is also preferably 4 mass % or less in terms of the suppression of display unevenness during black display in the liquid crystal display apparatus at normal temperature, at a high humidity, and after aging in a high temperature and humidity environment since the dependency of the retardation on humidity change becomes too great.

The water content is obtained by measuring a 7 mm×35 mm film specimen in a moisture measuring instrument and a specimen drying apparatus "CA-03" and "VA-05" {both manufactured by Mitsubishi Chemical Co., Ltd.} using the Karl Fischer method. The water content can be computed by dividing the moisture amount (g) by the specimen mass (g).

(Dimensional Change of the Film)

Regarding the dimensional stability of the optical film of the present invention, the (high-humidity) dimensional change rate in a case in which the optical film is left to stand for 24 hours under conditions of 60° C. under a relative humidity of 90% and the (high-temperature) dimensional change rate in a case in which the optical film is left to stand for 24 hours under conditions of 80° C. and a DRY environment (a relative humidity of 5% or less) are all preferably 0.5% or less.

The dimensional change rates are more preferably 0.3% or less, and still more preferably 0.15% or less.

(Photoelastic Coefficient)

In a case in which the optical film of the present invention is used as a protective film for a polarization plate, there are cases in which the birefringence (Re and Rth) changes due to a stress and the like caused by the shrinkage of a polarizer. The change in the birefringence due to the above-described stress can be measured as a photoelastic coefficient, and the range thereof is preferably 30 Br or less, more preferably in a range of −3 Br to 12 Br, and still more preferably in a range of 0 Br to 11 Br.

[Method for Manufacturing the Optical Film]

A method for manufacturing the optical film of the present invention includes a step of forming a macromolecular film by casting the thermoplastic resin and the moisture permeability-reducing compound on a support, in which the molecular weight of the moisture permeability-reducing compound is 200 or more, and the moisture permeability-reducing compound satisfies Formula (1) described below.

$$A/B \leq 0.9 \qquad \text{Formula (1)}$$

(In Formula (1), A represents a moisture permeability of an optical film in a case in which 10 mass % of the moisture permeability-reducing compound is added to the mass of the thermoplastic resin, and B represents a moisture permeability of an optical film in a case in which the thermoplastic resin is included and the moisture permeability-reducing compound is not added. Here, the moisture permeability is a moisture permeability in terms of a film thickness of 40 μM of the optical film after 24 hours at 40° C. under a relative humidity of 90% using a method of JIS Z-0208.)

Regarding the macromolecular film used in the stretching, the glass transition temperature Tg of the dried unstretched macromolecular film is preferably in a range of 100° C. to 200° C., and more preferably in a range of 100° C. to 150° C.

Here, the dried macromolecular film (dried film) refers to a film in which the residual solvent amount in the film is 3.0 mass % or less.

The dried macromolecular film refers to a film in which the residual solvent amount in the film is preferably 1.0 mass % or less, more preferably 0.5 mass % or less, still more preferably 0.3 mass % or less, and particularly preferably 0.2 mass % or less. The glass transition temperature can be adjusted using the kinds or mass ratio of the thermoplastic resin.

As a method for forming the macromolecular film, it is possible to use a manufacturing method such as an inflation method, a T-die method, a calendering method, a cutting method, a casting method, an emulsion method, or a hot press method, but solution film formation by the casting method is preferred from the viewpoint of the suppression of optical defects such as coloration suppression, the suppression of foreign matter defects, and die lines.

As a method for producing the optical film of the present invention, it is possible to use a solution casting method or a melt casting method.

In the case of the melt casting method, the step of forming the macromolecular film by casting the thermoplastic resin and the moisture permeability-reducing compound on a support is preferably a step of forming the macromolecular film by casting a melt of the thermoplastic resin and the moisture permeability-reducing compound on a support. As the melt casting method, it is possible to use the method described in detail in JP2009-154301A.

In the case of the solution casting method, the step of forming the macromolecular film by casting the thermoplastic resin and the moisture permeability-reducing compound on a support is preferably a step of forming the macromolecular film by casting a macromolecular solution (dope) including the thermoplastic resin, the moisture permeability-reducing compound, and a solvent on a support. When the macromolecular solution (dope) including the thermoplastic resin, the moisture permeability-reducing compound, and the solvent is cast on a support, the macromolecular film is formed.

<Solvent>

As a useful solvent to form the dope, any solvents can be used without any limitations as long as the solvents are capable of dissolving the thermoplastic resin, the moisture permeability-reducing compound, and other additives at the same time.

In the present invention, as the organic solvent, it is possible to use any of a chlorine-based solvent including a chlorine-based organic solvent as a main solvent and a non-chlorine-based solvent not including a chlorine-based organic solvent. A mixture of two or more organic solvents may be used.

When the dope is produced, a chlorine-based organic solvent is preferably used as a main solvent. In the present invention, the kind of the chlorine-based organic solvent is not particularly limited within a scope in which the thermoplastic resin is dissolved and cast so that a film can be formed as long as the purpose can be achieved. The chlorine-based organic solvent is preferably dichloromethane or chloroform. Dichloromethane is particularly preferred. In addition, there is no particular problem with the mixing of an organic solvent other than the chlorine-based organic solvent. In this case, it is necessary to use dichloromethane as much as at least 50 mass % of the total amount of the organic solvent. Other organic solvents that are jointly used with the chlorine-based organic solvent in the present invention will be described below. That is, a preferable organic solvent other than the chlorine-based organic solvent is preferably selected from esters, ketones, ethers, alcohols, hydrocarbons, and the like which have 3 to 12 carbon atoms. Esters, ketones, ethers, and alcohols may have a ring structure. A compound having two or more of any functional groups (that is, —O—, —CO—, and —COO—) of esters, ketones, and ethers can be used as the solvent, and the compound may have other functional groups such as alcoholic hydroxyl groups at the same time. In the case of a solvent having two or more kinds of functional groups, the number of carbon atoms is preferably within a range regulated by the compound having any functional groups.

As the other solvents, it is possible to use the solvents described in, for example, JP2007-140497A.

<Preparation of the Dope>

The dope can be prepared using an ordinary method including a treatment carried out at a temperature of 0° C. or higher (normal temperature or a high temperature). The dope that can be used in the present invention can be prepared using a method and an apparatus for preparing the dope in the ordinary solvent cast method.

The content of the thermoplastic resin is preferably adjusted so that the 10 mass % to 40 mass % of the thermoplastic resin is included in the obtained macromolecular solution.

The amount of the thermoplastic resin is still more preferably in a range of 10 mass % to 30 mass %. An arbitrary additive described below may be added to the organic solvent (main solvent).

The solution can be prepared by stirring the thermoplastic resin and the organic solvent at normal temperature (0° C. to 40° C.). A high-concentration solution may be stirred under conditions of pressurization and heating. Specifically, the thermoplastic resin and the organic solvent are put into a pressurization container, sealed, and stirred while being heated at a temperature which is the boiling point or higher of the solvent at normal temperature and at which the solvent is not boiled under pressurization.

The heating temperature is generally 40° C. or higher, preferably in a range of 60° C. to 200° C., and still more preferably in a range of 80° C. to 110° C.

As a casting method, it is possible to use the method described in paragraphs <0617> to <0889> of JP2005-104148A.

<Surface Treatment>

In some cases, when a surface treatment is carried out on the optical film, it is possible to improve the adhesiveness between the optical film and other layers (for example, a polarizer, a basecoat layer, and a back surface). For example, a glow discharge treatment, an ultraviolet irradiation treatment, a corona treatment, a flame treatment, acid, or an alkali treatment can be used. The glow discharge treatment mentioned herein may be low-temperature plasma generated in low-pressure gas of $10^{-3}$ Torr to 20 Torr, and furthermore, is also preferably a plasma treatment in the atmosphere. Plasma-excited gas refers to gas that is plasma-excited under the above-described conditions, and examples thereof include fluorocarbons such as argon, helium, neon, krypton, xenon, nitrogen, carbon dioxide, and tetrafluoro methane, mixtures thereof, and the like. The plasma-excited gas is described in detail in pp. 30 to 32 in the JIII's published technical report (Publication Number 2001-1745, issued on Mar. 15, 2001, Japan Institute of Invention and Innovation), and can be preferably used in the present invention.

<Functional Layer>

In addition, in the optical film of the present invention, it is preferable to laminate a functional layer having a film thickness of 0.1 um to 20 μm on at least one surface. The type of the functional layer is not particularly limited, and examples thereof include a hard coat layer, an antireflection layer (a layer having an adjusted refractive index such as a low refractive index layer, a medium refractive index layer, or a high refractive index layer), an antiglare layer, an antistatic layer, an ultraviolet absorbing layer, a low moisture permeable layer (moisture permeability-reducing layer), and the like.

A single functional layer may be provided, or multiple functional layers may be provided. A method for laminating the functional layer is not particularly limited, but it is preferable to provide the functional layer by co-casting the functional layer together with the optical film including the thermoplastic resin and the moisture permeability-reducing compound, or applying the functional layer onto the optical film including the thermoplastic resin and the moisture permeability-reducing compound.

In a case in which the functional layer is formed through coating and drying, it is preferable to use a monomer having an ethylenically unsaturated group as a binder. The monomer can be monofunctional or polyfunctional. Among them, a polymerizable polyfunctional monomer is preferably used, a photopolymerizable polyfunctional monomer is more preferably used, and a coating fluid including a monomer having two or more (meth)acryloyl groups is particularly preferably used.

Specific examples of the monomer having two or more (meth)acryloyl groups include (meth)acrylic acid diesters of alkylene glycol such as neopentyl glycol acrylate, 1,6-hexanediol (meth)acrylate, and propylene glycol di(meth)acrylate;

(meth)acrylic acid diesters of polyoxyalkylene glycol such as triethylene glycol di(meth)acrylate, dipropylene glycol di(meth)acrylate, polyethylene glycol di(meth)acrylate, and polypropylene glycol di(meth)acrylate;

(meth)acrylic acid diesters of polyhydric alcohols such as pentaerythritol di(meth)acrylate;

(meth)acrylic acid diesters of ethylene oxides or propylene oxide adducts such as 2,2-bis{4-(acryloxy•diethoxy)phenyl}propane and 2-2-bis{4-(acryloxy•polypropoxy)phenyl}propane;

and the like.

Furthermore, epoxy (meth)acrylates, urethane (meth)acrylates, and polyester (meth)acrylates are also preferably used as the photopolymerizable polyfunctional monomer.

Among them, esters of a polyhydric alcohol and (meth) acrylic acid are preferred. The polyhydric alcohol refers to a divalent or higher alcohol.

A polyfunctional monomer having three or more (meth) acryloyl groups in one molecule is preferred. Examples thereof include pentaerythritol tetra(meth)acrylate, pentaerythritol tri(meth)acrylate, trimethylol propane tri(meth)acrylate, ethylene oxide-modified trimethylol propane tri(meth)acrylate, propylene oxide-modified trimethylolpropane tri(meth)acrylate, ethylene oxide-modified phosphoric acid tri(meth)acrylate, trimethylol ethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, 1,2,3-cyclohexane tetramethacrylate, polyurethane polyacrylate, polyester polyacrylate, caprolactone-modified tris(acryloxyethyl) isocyanurate, and the like.

Examples further include resins having three or more (meth)acryloyl groups, for example, polyester resins having a relatively low molecular weight, polyether resins, acryl resins, epoxy resins, urethane resins, alkyd resins, spiroacetal resins, polybutadiene resins, polythiol polyene resins, oligomers or prepolymers of polyfunctional compounds such as polyhydric alcohols, and the like.

As other polyfunctional monomer, it is also possible to use, for example, dendrimers described JP2005-76005A and JP2005-36105A.

As the polyfunctional monomer, it is also possible to preferably use esters of a polyhydric alcohol and (meth) acrylic acid and amides of a polyhydric alcohol and isocyanate containing a plurality of (meth)acryloyl groups.

The polyhydric alcohol is not particularly limited, but is preferably an aliphatic alcohol, and, among aliphatic alcohols, an alcohol having a cyclic aliphatic hydrocarbon group is more preferred. The aliphatic group in a monocyclic alicyclic alcohol is preferably a cycloalkyl group having 3 to 8 carbon atoms, and examples thereof include a cyclopentyl group, a cyclohexyl group, a cyclobutyl group, a cyclooctyl group, and the like.

Examples of the aliphatic group in the polycyclic alicyclic alcohols include groups having a bicyclo, tricyclo or tetracyclo structure having 5 or more carbon atoms, a cycloalkyl group having 6 to 20 carbon atoms is preferred, and examples thereof include an adamantyl group, a norbornyl group, a dicyclopentyl group, a tricyclodecanyl group, a tetracyclododecyl group, the central skeletons of the compounds described in the claims of JP2006-215096A, the central skeletons of the compounds described in JP2001-10999A and the like. Meanwhile, a part of the carbon atoms in the cycloalkyl group may be substituted by a hetero atom such as an oxygen atom.

Among them, from the viewpoint of decreasing the moisture permeability, the polycyclic alcohol is particularly preferably a polyhydric alcohol having an adamantyl group, a norbornyl group, a dicyclopentyl group, a tricyclodecanyl group, a tetracyclododecyl group, the central skeleton of the compound described in the claims of JP2006-215096A, and the central skeleton of the compound described in JP2001-10999A.

Two or more polymerizable polyfunctional monomers may be jointly used. The monomers having an ethylenically unsaturated group can be polymerized by radiating ionizing radiation to the monomers or heating the monomers in the presence of a photoradical initiator or a thermal radical initiator.

In the polymerization reaction of the photopolymerizable polyfunctional monomers, a photopolymerization initiator is preferably used. The photopolymerization initiator is preferably a photo radical polymerization initiator or a photo cationic polymerization initiator, and particularly preferably a photo radical polymerization initiator.

It is also preferable to jointly use the polymerizable polyfunctional monomer and the monofunctional monomer.

The monofunctional monomer is preferably a monomer having one (meth)acryloyl group, and generally, the monomer having one (meth)acryloyl group is obtained from a monovalent alcohol and an acrylic acid.

The monovalent alcohol may be an aromatic alcohol or an aliphatic alcohol.

Examples of the monovalent alcohol include methyl alcohol, n-propyl alcohol, iso-propyl alcohol, n-butyl alcohol, tert-butyl alcohol, n-amyl alcohol, diacetone alcohol, 1-methoxy-2-propanol, furfuryl alcohol, 2-octanol, 2-ethylhexanol, nonanol, n-decanol, undecanol, n-dodecanol, trimethylnonyl alcohol, benzyl alcohol, phenethyl alcohol, ethylene glycol monoisoamyl ether, ethylene glycol monophenyl ether, ethylene glycol monobenzyl ether, and ethylene glycol monohexyl ether.

The aliphatic part of the aliphatic alcohol may be cyclic aliphatic. The cyclic aliphatic part may be a monocyclic-type aliphatic part or a polycyclic-type aliphatic part, and may be a bridge-type aliphatic part in the case of the polycyclic-type aliphatic part. The monocyclic-type aliphatic part is preferably a cycloalkyl group having 3 to 8 carbon atoms, and examples thereof include a cyclopentyl group, a cyclohexyl group, a cyclobutyl group, a cyclooctyl group, and the like. Examples of the polycyclic-type aliphatic part include groups having a bicyclo, tricyclo, or tetracyclo structure having 5 or more carbon atoms, a cycloalkyl group having 6 to 20 carbon atoms is preferred, and examples thereof include an adamantyl group, a norbornyl group, a dicyclopentyl group, a tricyclodecanyl group, a tetracyclododecyl group, the central skeletons of the compounds described in the claims of JP2006-215096A, the central skeletons of the compounds described in JP2001-10999A, and the like. A part of the carbon atoms in the cycloalkyl group may be substituted by a hetero atom such as an oxygen atom.

The monovalent alcohol preferably has 6 or more carbon atoms in both cases of an aromatic alcohol and an aliphatic alcohol.

The (meth)acrylic acid is preferably acrylic acid or methacrylic acid.

To use an antireflection layer (a layer to adjust the refractive index such as a low refractive index layer, a medium refractive index layer, or a high refractive index layer), an antiglare layer, an antistatic layer, an ultraviolet absorbing layer, or a low moisture permeability layer (moisture permeability-reducing layer) as the functional layer, a variety of additives may be added.

The thickness of the functional layer is more preferably in a range of 0.01 µm to 100 and particularly preferably in a range of 0.02 µm to 50 µm. Furthermore, the thickness of the functional layer to reduce the moisture permeability is more particularly preferably in a range of 0.1 µm to 20 µm.

In a case in which the functional layer to reduce the moisture permeability is used, the moisture permeability (C) of the optical film in which the functional layer is laminated and the moisture permeability (D) of the optical film in which the functional layer is not laminated has a C/D relationship of preferably 0.9 or less, more preferably 0.85 or less, and still more preferably 0.8 or less.

(Composition of the Low Moisture Permeability Layer)

As the functional layer, it is possible to preferably use a low moisture permeability layer.

The low moisture permeability layer that can be used in the optical film of the present invention is preferably a layer formed of a composition including a compound having a cyclic aliphatic hydrocarbon group and an unsaturated double bond in the molecule or a layer including a resin having a repeating unit derived from a chlorine-containing vinyl monomer, and is more preferably a layer formed of a composition including a compound having a cyclic aliphatic hydrocarbon group and an unsaturated double bond in the molecule.

The layer formed of a composition including a compound having a cyclic aliphatic hydrocarbon group and an unsaturated double bond in the molecule as a main component will be described.

<<The Layer Formed of a Composition Including a Compound Having a Cyclic Aliphatic Hydrocarbon Group and an Unsaturated Double Bond in the Molecule as a Main Component>>

In the present invention, the layer formed of a composition including a compound having a cyclic aliphatic hydrocarbon group and an unsaturated double bond in the molecule as a main component, to impart a low moisture permeability, has a cyclic aliphatic hydrocarbon group, contains a compound having an unsaturated double bond group in the molecule, and furthermore, as necessary, can be formed by applying, drying, and curing a composition containing a polymerization initiator, translucent particles, a fluorine-containing or silicone-based compound, and a solvent on a support directly or through other layers. Hereinafter, the respective components will be described. The main component of the composition or the layer refers to a component accounting for 50 mass % or more of the composition or the layer.

[Compound Having a Cyclic Aliphatic Hydrocarbon Group and an Unsaturated Double Bond Group in the Molecule]

The compound having a cyclic aliphatic hydrocarbon group and an unsaturated double bond in the molecule functions as a binder. In addition, a compound having a cyclic aliphatic hydrocarbon group and having an unsaturated double bond is capable of functioning as a curing agent, and is capable of improving the strength or scratch resistance of a coated film and imparting a low moisture permeability at the same time.

Use of the above-described compound is capable of realizing a low moisture permeability and a high film strength. The detail is not clear, but it is considered as described below. When a compound having a cyclic aliphatic hydrocarbon group in the molecule is used, a hydrophobic cyclic aliphatic hydrocarbon group is introduced into the low moisture permeability layer, and the layer is hydrophobilized, whereby the incorporation of molecules from the outside is prevented, and the moisture permeability decreases. In addition, when an unsaturated double bond group is included in the molecule, the crosslinking point density increases, and the diffusion path of water molecules in the low moisture permeability layer is limited. An increase in the crosslinking point density also has an effect that relatively increases the density of the cyclic aliphatic hydrocarbon group, makes the inside of the low moisture permeability layer more hydrophobic, prevents the adsorption of water molecules, and decreases the moisture permeability.

The number of the unsaturated double bond groups in the molecule is more preferably two or more to increase the crosslinking point density.

The cyclic aliphatic hydrocarbon group is preferably a group derived from an alicyclic compound having 7 or more carbon atoms, more preferably a group derived from an alicyclic compound having 10 or more carbon atoms, and still more preferably a group derived from an alicyclic compound having 12 or more carbon atoms.

The cyclic aliphatic hydrocarbon group is particularly preferably a group derived from a polycyclic compound such as a bicyclic or tricyclic compound.

More preferable examples thereof include the central skeletons of the compounds described in the claims of JP2006-215096A, the central skeletons of the compounds described in JP 2001-10999A, the skeletons of adamantane derivatives, and the like.

Specific examples of the cyclic aliphatic hydrocarbon group include norbornyl, tricyclodecanyl, tetracyclododecanyl, pentacyclopentadecanyl, adamantyl, diadamantyl, and the like.

Examples of the unsaturated double bond group include polymerizable functional groups such as a (meth)acryloyl group, a vinyl group, a styryl group, and an allyl group, and among them, a (meth)acryloyl group and $-C(O)OCH=CH_2$ are preferred. Particularly preferably, it is possible to use a compound having three or more (meth)acryloyl groups in a molecule described below.

The compound having the cyclic aliphatic hydrocarbon group and having three or more unsaturated double bond groups in the molecule is constituted by bonding the cyclic aliphatic hydrocarbon group and a group having an unsaturated double bond through a linking group.

Examples of the linking group include a single bond, an alkylene group having 1 to 6 carbon atoms which may be substituted, an amide group in which the N position may be substituted, a carbamoyl group in which the N position may be substituted, an ester group, an oxycarbonyl group, an ether group, and groups obtained by combining the above-described groups.

These compounds can be easily synthesized through, for example, a single-stage or two-stage reaction between a polyol such as a diol or a triol having the cyclic aliphatic hydrocarbon group and a carboxylic acid, a carboxylic acid derivative, an epoxy derivative, an isocyanate derivative of a compound having a (meth)acryloyl group, a vinyl group, a styryl group, an allyl group, and the like. Preferably, the compound can be synthesized through a reaction with a polyol having the cyclic aliphatic hydrocarbon group using a compound such as (meth)acrylic acid, (meth)acryloyl chloride, a (meth)acrylic anhydride, or glycidyl (meth)acrylate, or the compound described in WO2012/00316A (for example, 1,1-bis(acryloxymethyl) ethyl isocyanate).

[Polymerization Initiator]

A composition including the compound having the cyclic aliphatic hydrocarbon group and the unsaturated double bond in the molecule as a main component preferably includes a polymerization initiator, and the polymerization initiator is preferably a photopolymerization initiator.

Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfonium, lophine dimers, onium salts, borate salts, active esters, active halogen, inorganic complexes, coumarins, and the like. The specific examples, preferred embodiments, and commercially available products of the photopolymerization initiator are described in paragraphs <0133> to <0151> of JP2009-098658A, and these can be preferably used in the present invention as well in the same manner.

"The latest UV curing technology" {Technical Information Institute Co., Ltd.} (1991), p. 159 and "Ultraviolet curing systems" by Kiyoshi Kato (1989, published by Sogo Gijutsu Center), p. 65 to 148 also describe a variety of examples, which are useful in the present invention.

Preferable examples of the commercially available light cleavage-type photo-radical polymerization initiator include "IRGACURE 651", "IRGACURE 184", "IRGACURE 819", "IRGACURE 907", "IRGACURE 1870" (CGI-403/IRGACURE 184=7/3 mixture initiator), "IRGACURE 500" "IRGACURE 369" "IRGACURE 1173" "IRGACURE 2959", "IRGACURE 4265", "IRGACURE 4263", "IRGACURE 127", and "OXE01" all manufactured by Ciba Specialty Chemicals Co., Ltd.; "KAYACURE DETX-S", "KAYACURE BP-100", "KAYACURE BDMK", "KAYACURE CTX", "KAYACURE BMS", "KAYACURE 2-EAQ", "KAYACURE ABQ", "KAYACURE CPTX", "KAYACURE EPD", "KAYACURE ITX", "KAYACURE QTX", "KAYACURE BTC", and "KAYACURE MCA" all manufactured by Nippon Kayaku Co., Ltd.; "Esacure (KIP100F, KB1, EB3, BP, X33, KT046, KT37, KIP150, TZT)" manufactured by Sartomer, and combinations thereof.

The content of the photopolymerization initiator in the composition including the compound having the cyclic aliphatic hydrocarbon group and the unsaturated double bond in the molecule as a main component, which is used in the present invention, is preferably in a range of 0.5 mass % to 8 mass %, and more preferably in a range of 1 mass % to 5 mass % with respect to the total solid content in a composition for forming a hard coat layer since a polymerizable compound included in the composition is polymerized, and the initiation point is set not to be excessively increased.

[Solvent]

The composition including the compound having the cyclic aliphatic hydrocarbon group and the unsaturated double bond in the molecule as a main component, which is used in the present invention, is capable of including a solvent. A variety of solvents can be used as the solvent in consideration of the solubility of the monomer, the drying properties during coating, the dispersibility of the translucent particles, and the like. Examples of the organic solvent include dibutyl ether, dimethoxyethane, diethoxyethane, propylene oxide, 1,4-dioxane, 1,3-dioxolane, 1,3,5-trioxane, tetrahydrofuran, anisole, phenetole, dimethyl carbonate, methyl ethyl carbonate, diethyl acetone, acetone, methyl ethyl ketone (MEK), diethyl ketone, dipropyl ketone, diisobutyl ketone, cyclopentanone, cyclohexanone, methyl cyclohexanone, ethyl formate, propyl formate, pentyl formate, methyl acetate, ethyl acetate, propyl acetate, methyl propionate, ethyl propionate, γ-butyrolactone, 2-methoxyethyl acetate, 2-ethoxymethyl acetate, 2-ethoxyethyl acetate, 2-ethoxyethyl propionate, 2-methoxyethanol, 2-propoxy ethanol, 2-butoxy ethanol, 1,2-diacetoxyacetone, acetylacetone, diacetone alcohol, methyl alcohols such as methyl acetoacetate and ethyl acetoacetate, ethyl alcohol, isopropyl alcohol, n-butyl alcohol, cyclohexyl alcohol, isobutyl acetate, methyl isobutyl ketone (MIBK), 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethyl cyclohexane, benzene, toluene, xylene, and the like. The organic solvent may be singly used, or a combination of two or more organic solvents may be used.

The solvent is used so that the concentration of the solid content of the composition including the compound having the cyclic aliphatic hydrocarbon group and the unsaturated double bond in the molecule as a main component, which is used in the present invention, preferably falls into a range of 20 mass % to 80 mass %, more preferably falls into a range of 30 mass % to 75 mass %, and still more preferably falls into a range of 40 mass % to 70 mass %.

Meanwhile, regarding a layer including the resin having a repeating unit derived from a chlorine-containing vinyl monomer, the coated layer described in <0042> to <0058> of JP2008-230036A can be preferably used. As components for forming a layer formed of a composition including vinylidene chloride as a main component, among the materials of the coated layer described in <0042> to <0058> of JP2008-230036A, "SARAN RESIN 8204" and the like manufactured by Asahi Kasei Life & Living Co., Ltd. are preferably used.

Meanwhile, the main component of the composition or the layer refers to a component accounting for 50 mass % or more of the composition or the layer.

(Constitution and Manufacturing Method of the Low Moisture Permeability Layer)

A single layer or multiple layers of the low moisture permeability layer may be provided. There is no particular limitation regarding the method for laminating the low moisture permeability layer, but the production of the low moisture permeability layer by co-casting the low moisture permeability layer together with a base material film or the provision of the low moisture permeability layer on the base material film through coating and laminating is preferred, and the provision of the low moisture permeability layer on the base material film through coating and laminating is more preferred. That is, in the optical film of the present invention, the low moisture permeability layer is preferably laminated on the base material film through coating.

(Film Thickness of the Low Moisture Permeability Layer)

The film thickness of the low moisture permeability layer is preferably in a range of 1 µm to 20 µm, more preferably in a range of 2 µm to 18 µm, and particularly preferably in a range of 3 µm to 17 µm.

The low moisture permeability layer in the optical film of the present invention is also preferably provided with a hard coat layer function, an antireflection layer function, an antifouling function, and the like.

(Other Functional Layers—Optical Anisotropic Layer—)

The optical film of the present invention may include other optical anisotropic layers, and a schematic cross-sectional view of an example of a preferable embodiment thereof is illustrated in FIG. 1.

An optical film 10 illustrated in FIG. 1 includes a transparent support 14, an optical anisotropic layer 12, and a base material 16, and the optical anisotropic layer 12 may be a layer generating a phase difference which may be an optical anisotropic layer in which a film having a certain phase difference is uniformly formed in the plane or a patterned optical anisotropic layer in which regions having mutually different slow axis and phase differences are regularly disposed in the plane.

In the optical film in FIG. 1, the molecular weight is 200 or more, and the moisture permeability-reducing compound satisfying Formula (1) described below may be included in the transparent support 14.

As the optical anisotropic layer in which a film having a certain phase difference is uniformly formed in the plane, a λ/4 film is preferred, and as a specific embodiment of the optical film including a λ/4 film as the optical anisotropic layer, it is possible to appropriately use the optical anisotropic layers and optical films described in JP2012-098721A, JP2012-103689A, and JP2012-177894A.

The optical film including a λ/4 film as the optical anisotropic layer can be used as a brightness-improving plate, a 3D liquid crystal display apparatus, and the like, and is particularly useful as a member of an active-type 3D liquid crystal display apparatus.

Figure 2:
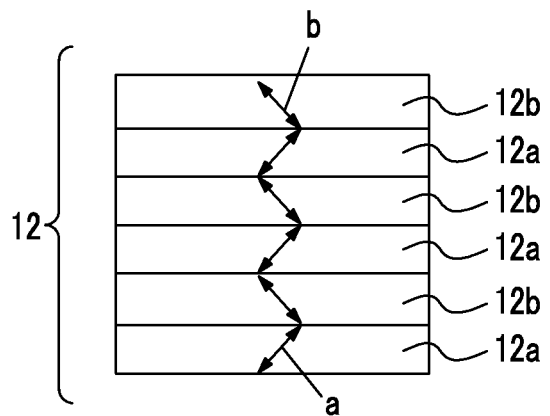
FIG. 2 is a schematic view of a top surface of an example of a patterned optical anisotropic layer in a case in which the optical film of the present invention includes the patterned optical anisotropic layer as a functional layer.

Next, a schematic cross-sectional view of a typical example of the patterned optical anisotropic layer 12 is described in FIG. 2.

The schematic cross-sectional view illustrates a patterned optical anisotropic layer having first and second phase difference regions 12a and 12b equally and symmetrically disposed in an image displaying apparatus. The first and second phase difference regions 12a and 12b preferably have mutually orthogonal in-plane slow axes a and b respectively.

Furthermore, a patterned λ/4 layer in which the in-plane slow axes a and b of the first and second phase difference regions 12a and 12b are orthogonal to each other, and the in-plane retardation Re is λ/4 is preferred. When the patterned optical anisotropic layer of this embodiment and a polarization film are combined together, light rays that have passed through the first and second phase difference regions respectively fall into circular polarization states of the mutually opposite directions, and circularly polarized images for right eye and left eye are formed respectively.

Regarding the specific embodiments of the optical film including the patterned λ/4 layer as the optical anisotropic layer, it is possible to appropriately use the optical anisotropic layers and optical films described in JP4825934B and JP4887463B.

The optical film 10 is useful as a member of a 3D liquid crystal display apparatus, particularly, a passive-type 3D liquid crystal display apparatus. In this embodiment, polarized images that have passed through the first and second phase difference regions 12a and 12b respectively are recognized as images for right eye and left eye through polarized glasses or the like. Therefore, the first and second phase difference regions 12a and 12b preferably have mutually the same shape so as to prevent right and left images from becoming not uniform, and the dispositions thereof are preferably equal or symmetric to each other.

The patterned optical anisotropic layer 12 is not limited to the embodiment illustrated in FIG. 2, and it is possible to use, for example, a display pixel region in which one in-plane retardation of the first and second phase difference regions is λ/4, and the other in-plane retardation is 3λ/4. Furthermore, it is also possible to use a phase difference region in which one in-plane retardation of the first and second phase difference regions 12a and 12b is λ/2, and the other in-plane retardation is 0.

The optical film of the present invention can be used as an optical compensation film of a liquid crystal display apparatus. The liquid crystal display apparatus more preferably has a constitution in which a liquid crystal cell carrying liquid crystals is disposed between two electrode substrates, two polarization elements are disposed on both sides of the liquid crystal cell, and at least one optical film of the present invention is disposed between the liquid crystal cell and the polarization element as an optical compensation film. The liquid crystal display apparatus is preferably a TN, IPS, FLC, AFLC, OCB, STN, ECB, VA, or HAN-mode liquid crystal display apparatus, more preferably a TN, OCB, IPS, and VA-mode liquid crystal display apparatus, and still more preferably a VA-mode liquid crystal display apparatus.

At this time, a variety of functional layers may be supplied to the optical film of the present invention. Examples of the functional layer include an antistatic layer, a cured resin layer (transparent hard coat layer), an antireflection layer, an easy adhesive layer, an antiglare layer, an optical anisotropic layer, an orientation layer, a liquid crystal layer, and the like. Examples of the functional layers and materials thereof include a surfactant, a lubricant, a matting agent, an antistatic layer, a hard coat layer, and the like, are descried in detail in pp. 32 to 45 in the JIII's published technical report (Publication Number 2001-1745, issued on Mar. 15, 2001, Japan Institute of Invention and Innovation), and can be preferably used in the present invention.

[Polarization Plate]

The polarization plate of the present invention includes at least one optical film of the present invention as a protective film for a polarizer.

The optical film of the present invention can be used as a protective film for the polarization plate. In this case, it is possible to overlap the optical compensation film and the protective film for the polarization plate in the liquid crystal display apparatus. In a case in which the optical film of the present invention is used as the protective film for the polarization plate, there is no particular limitation regarding the method for producing the polarization plate, and the polarization plate can be produced using an ordinary method. There is a method in which the obtained optical film is alkali-treated, and is attached to both surfaces of a polarizer, which has been produced by immersing and stretching a polyvinyl alcohol film in an iodine solution, using an aqueous solution of fully-saponified polyvinyl alcohol. Instead of the alkali treatment, an easy adhesion process as described in JP1994-94915A (JP-H06-94915A) and JP1994-118232A (JP-H06-118232A) may be carried out. In addition, the above-described surface treatment may be carried out.

Examples of an adhesive used to attach a protective film treatment surface and the polarizer include polyvinyl alcohol-based adhesives such as polyvinyl alcohol and polyvinyl butyral, vinyl-based latexes such as butyl acrylate, and the like.

The polarization plate is constituted of the polarizer and protective films protecting both surfaces of the polarizer, and furthermore, is constituted by attaching a protect film to one surface of the polarizer and a separate film to the opposite surface. The protect film and the separate film are used to protect the polarization plate during the shipment of the polarization plate, the inspection of the product, and the like. In this case, the protect film is attached to protect the surface of the polarization plate, and is used on the opposite surface side to the surface on which the polarization plate is attached to a liquid crystal plate. Alternatively, the separate film is used to cover the adhesive layer attached to the liquid crystal plate, and is used on a surface side on which the polarization plate is attached to the liquid crystal plate.

In the liquid crystal display apparatus, generally, a substrate including a liquid crystal cell between two polarization plates is disposed, but the protective film for the polarization plate, to which the optical film of the present invention is applied, can be used as a protective film for all of the two polarization plates; however, among the two protective films for the respective polarization plates, the protective film is preferably used as a protective film disposed on the liquid crystal cell side with respect to the polarizer.

(Optical Compensation Film)

The optical film of the present invention can be used in a variety of usages, and the use of the optical film as an optical compensation film in a liquid crystal display apparatus produces a particular effect. Meanwhile, the optical compensation film refers to an optical material that is generally used in a liquid crystal display apparatus and compensates the phase difference, and has the same meaning as a phase difference plate, an optical compensation sheet, and the like. The optical compensation film has birefringence, and is used to remove coloration of a display screen in the liquid crystal display apparatus or improve the viewing angle characteristics.

The optical film of the present invention may be used as an optical compensation film, or may be used as a support for an optical compensation film on which an optical anisotropic layer is provided. The optical anisotropic layer is not limited by the optical performance or driving method of the liquid crystal cell in the liquid crystal display apparatus in which the optical film of the present invention is used, and it is possible to jointly use any optical anisotropic layers required as the optical compensation film. The jointly used optical anisotropic layer may be formed of a composition including a liquid crystalline compound, or may be formed of a thermoplastic film having birefringence.

[Liquid Crystal Display Apparatus]

The liquid crystal display apparatus of the present invention includes the liquid crystal cell and the polarization plate of the present invention disposed in at least one side of the liquid crystal cell, and is disposed so that the optical film of the present invention included in the polarization plate serves as the outermost layer.

(Kinds of the Liquid Crystal Display Apparatus)

The film of the present invention can be used in liquid crystal cells of a variety of modes. A variety of display modes such as Twisted Nematic (TN), In-Plane Switching (IPS), Ferroelectric Liquid Crystal (FLC), Anti-ferroelectric Liquid Crystal (AFLC), Optically Compensatory Bend (OCB), Super Twisted Nematic (STN), Vertically Aligned (VA), Electrically Controlled Birefringence (ECB), and Hybrid Aligned Nematic (HAN) have been proposed. In addition, a display mode in which the above-described display modes are oriented and divided has been proposed. The optical film of the present invention is effective in the liquid crystal display apparatuses of any display modes. In addition, the optical film is also effective in any liquid crystal display apparatuses such as a permeation-type liquid crystal display apparatus, a reflection-type liquid crystal display apparatus, and a semi permeation-type liquid crystal display apparatus.

EXAMPLES

Hereinafter, the present invention will be specifically described on the basis of examples. Materials, reagents, substance amounts and proportions thereof, operations, and the like described in the following examples can be appropriately changed within the scope of the purpose of the present invention. Therefore, the present invention is not limited to the following examples.

(Thermoplastic Resin)

Acryl resins and thermoplastic resins described below were used. The acryl resins and the thermoplastic resins can be procured from commercially available products or using a well-known synthesis method.

PMMA, trade name: DIANAL BR88, manufactured by Mitsubishi Rayon Co., Ltd.

PS, trade name: G9504, manufactured by PS Japan Corporation

SAN, trade name: CEVIAN 050SF, manufactured by Daicel Polymer Co., Ltd.

Norbornene (norbornene-based resin), trade name: ARTON F5023, manufactured by JSR Corporation Lactone (an acryl resin that is a lactone ring-containing polymer, synthesized using a synthesis method described below)

(Moisture Permeability-Reducing Compound)

A moisture permeability-reducing compound having a structure described below was used.

The A/B value of the used moisture permeability-reducing compound was obtained by computing the moisture permeability A and B using the following method. That is, an optical film of Example 1 obtained by adding 10 mass % of the moisture permeability-reducing compound to the thermoplastic resin (PMMA) and optical films of Examples 3 to 5 in which the thermoplastic resin (PMMA) in Example 1 was changed to other thermoplastic resins were produced, and the moisture permeability A was obtained using the following method. Separately, optical films of Comparative Examples 2 to 5 which included a variety of the thermoplastic resins used in Examples 1 and 3 to 5, but did not include any moisture permeability-reducing compound were produced, and the moisture permeability B was obtained using the same method as the method for measuring the moisture permeability A.

B-7 (procured from Wako Pure Chemical Industries, Ltd., molecular weight 246)

[Chem. 25]

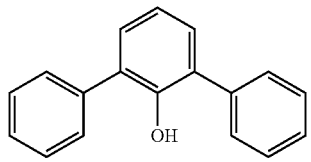

B-7 (procured from Wako Pure Chemical Industries, Ltd., molecular weight 246)

C-1 manufactured by Sumitomo Bakelite Co., Ltd. novolac resin, SUMILITERESIN PR-HF-3

C-2 p-cresol novolac resin (following structure)

[Chem. 26]

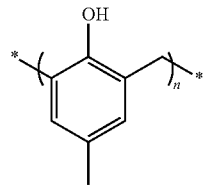

(Weight Average Molecular Weight: Approximately 2500)

C-3 hydrogenated terpene resin manufactured by Yasuhara Chemical Co., Ltd., CLEARON P150 (weight average molecular weight of 200 or more)

C-4 xylene resin manufactured by Fudow Co., Ltd., NICANOR Y1000 (the following structure)

[Chem. 27]

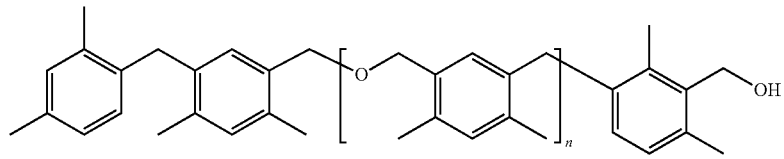

(Weight Average Molecular Weight: 200 or More)

C-5 barbituric acid (the following structure)

[Chem. 28]

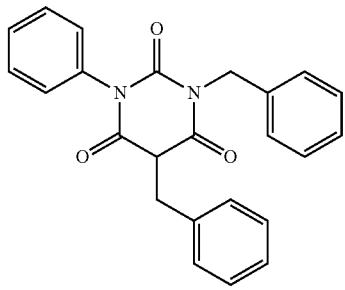

(Ultraviolet Absorber)

An ultraviolet absorber described below was used.

UV agent 1: TINUVIN 328 (manufactured by Ciba Specialty Chemicals Co., Ltd.)

(Brittleness Modifier)

Brittleness modifier 1: manufactured by Kuraray Co., Ltd., LA4285

Example 1

<Production of Optical Film 101>

(Preparation of a Dope)

A composition described below was put into a mixing tank, stirred under heating, and individual components were dissolved, thereby preparing a dope.

| (Composition of the dope) | |
| --- | --- |
| PMMA resin | 100 parts by mass |
| Moisture permeability-reducing compound B-7 | 10 parts by mass |
| UV agent 1 | 2.4 parts by mass |
| Brittleness modifier 1 | 5.0 parts by mass |
| Dichloromethane | 534 parts by mass |
| Methanol | 46 parts by mass |

The prepared dope was uniformly cast from a casting die to a stainless steel endless band (casting support) in a width of 2000 mm using a band casting apparatus. A macromolecular film was peeled off from the casting support when the residual solvent amount in the dope reached 15 mass %, and was dried at 120° C. in a drying zone while conveying with a tenter without being actively stretched.

<Evaluation of the Optical Film>

For the produced film, the film thickness was measured, and the following physical properties were measured and evaluated. The results are described in Table 1.

(Moisture Permeability)

The moisture permeability after aging for 24 hours at 40° C. under a relative humidity of 90% using the method of JIS Z-0208 was converted to a 40 μm film thickness.

In addition, the moisture permeability of the optical films obtained in individual examples described below is indicated by a, and, among the optical films of Comparative Examples 2 to 5 described below, the moisture permeability of the moisture permeability of the optical films in individual comparative examples in which the same kinds of polymers as the kinds of the polymers used in the optical films of the respective examples is indicated by B, and the a/B value was computed.

(Re and Rth)

The humidity of a sample film was adjusted by aging for 24 hours at 25° C. under a relative humidity of 60%. Next, the phase differences at a wavelength of 590 nm were measured using an automatic birefringence meter (KOBRA-21ADH: manufactured by Oji Scientific Instruments Co., Ltd.) at 25° C. under a relative humidity of 60% in a direction perpendicular to the film surface and in directions inclined by 10° in a range of +50° to −50° from the normal line to the film surface using the slow axis as the rotational axis, and the in-plane retardation value (Re) and the retardation value (Rth) in the film thickness direction were computed.

<Production of the Polarization Plate>

(Production of the Polarization Plate for which the Optical Film 101 was Used)

1) Saponification of the Film

After a commercially available cellulose triacetate film (FUJITAC ZRD40, manufactured by Fujifilm Corporation) was immersed in an aqueous solution of 1.5 mol/L of NaOH (saponification solution) which was held at 55° C. for two minutes, the film was washed by water, then, was immersed in an aqueous solution of 0.05 mol/L of sulfuric acid at 25° C. for 30 seconds, furthermore, and was passed through flowing water for 30 seconds in a washing bath, thereby putting the film into a neutral state. In addition, water dripping was repeated three times using an air knife, after water was dropped, and the film was retained in a drying zone at 70° C. for 15 seconds so as to be dried, thereby producing a saponified film.

2) Production of a Polarizer

Iodine was adsorbed to a stretched polyvinyl alcohol film according to Example 1 in JP2001-141926A, thereby producing a polarizer having a film thickness of 20 μm.

3) Attachment

The corona-treated film 101 was attached to a single surface of the polarizer using an acryl adhesive. The saponified cellulose triacetate film was attached to the other side using a polyvinyl alcohol-based adhesive, and was dried at 70° C. for 10 minutes or longer, thereby producing a polarization plate in which the film 101 was used. Here, the films were disposed so that the permeation axis of the polarizer and the transportation direction of the film were orthogonal to each other. The obtained polarization plate was used as a polarization plate of Example 1.

Examples 2 to 7 and 10 to 15, and Comparative Examples 2 to 6

(Production of Optical Films 102 to 107 and 110 to 115, and Optical Films 2 to 6 of the Comparative Examples)

A dope (a solid content concentration of 20 mass %) was prepared in the same manner as the production of the optical film 101 except for the facts that, in the production of the optical film 101 of Example 1, the kind of the thermoplastic resin (polymer), the kind and amount of the moisture permeability-reducing compound were changed as described in Table 1, only dichloromethane was used as a solvent, and the brittleness modifier 1 was not used. Optical films 102 to 107 and 110 to 115 of Examples 2 to 7 and 10 to 15 and optical films 2 to 6 of Comparative Examples 2 to 6 were produced under the same casting film formation conditions as in the production of the optical film 101 of Example 1.

In addition, a pellet of a lactone ring-containing polymer was obtained according to the synthesis method described in <0230> to <0232> in WO2006/025445A. Next, the pellet was dissolved, thereby producing an optical film 107 of Example 7 in the same manner as the optical film 101 of Example 1. In addition, an optical film 106 of Comparative Example 6 was produced using the pellet in the same manner as the optical film 101 of Example 1 except for the fact that the moisture permeability-reducing compound was not added.

Example 8

A 490 μm-thick film was produced in the same manner as in Example 6 except for the fact that the thickness during the casting film formation was changed in Example 6, and the film was stretched 3.4 times and 3.6 times respectively in the transportation direction and the width direction at 120° C., thereby producing a 40 μm-thick optical film 108 of Example 8.

Example 9

A 490 μm-thick film was produced in the same manner as in Example 6 except for the fact that the polymer was changed to a norbornrene-based resin (trade name: ARTON), and the thickness during the casting film formation was changed in Example 6, and the film was stretched 3.4 times and 3.6 times respectively in the transportation direction and the width direction at 130° C., thereby producing a 40 μm-thick optical film 109 of Example 9.

The film thickness, moisture permeability, Re, and Rth of the optical films obtained in the respective examples and comparative examples were measured in the same manner as Example 1. The obtained results are described in Table 1.

(Production of the Polarization Plate)

Polarization plates for which the optical films 102 to 115 of Examples 2 to 15 were used and polarization plates for which the optical films 2 to 6 of Comparative Examples 2 to 6 were used were produced using the same method as for the polarization plate of Example 1.

[Evaluation of a Panel]

<Mounting on an IPS Panel>

The upper and lower polarization plates of an IPS-mode liquid crystal cell (manufactured by LGD, 42LS5600) were peeled off, and the above-described polarization plate was attached so that ZRD40 was located on the liquid crystal cell side. A crossed nicol disposition was made so that the permeation axis of the upper polarization plate ran in the vertical direction, and the permeation axis of the lower polarization plate ran in the horizontal direction.

The constitutions of the polarization plates of the respective examples and comparative examples during the mounting in the IPS panel are described in Table 2.

Black display unevenness in the liquid crystal display apparatuses produced as described above after aging in a high temperature and humidity environment was evaluated. The results are described in Table 1.

(Black Display Unevenness after Aging in a High Temperature and Humidity Environment)

The liquid crystal display apparatus was left to stand for 48 hours in an environment of 60° C. under a relative humidity of 90%, and then the humidity was adjusted by aging for 24 hours in an environment of 25° C. under a relative humidity of 60%. After the adjustment of the humidity, the liquid crystal display apparatus was turned on, the degree of color unevenness during black display was visually observed, and the black display unevenness was evaluated into four levels according to the following standards.

A: Color unevenness was not observed.

B: Slight color unevenness was observed at one or two out of four corners of a display surface.

C: Slight color unevenness was observed at four corners of a display surface.

D: Strong color unevenness was observed at one or two out of four corners of a display surface.

E: Strong color unevenness was observed at four corners of a display surface.

TABLE 1

| | | | | Constitution of optical film | | | Evaluation of optical film | | | | Evaluation of panel |
|---|---|---|---|---|---|---|---|---|---|---|---|
| | | | | | Additives | | Moisture permeability | | | | Black display |
| | Film No. | Thermoplastic resin | Thickness (μm) | Kind | Moisture permeability A (10 mass %)/moisture permeability B (none) | Amount (mass %) | Moisture permeability a (g/m²/day) 40μ-converted | Moisture permeability a/ moisture permeability B (none) | Re (nm) | Rth (nm) | unevenness after aging in high temperature and humidity environment |
| Comparative Example 2 | 2 | PMMA | 40 | — | — | — | 90 | — | 0 | −3 | D |
| Comparative Example 3 | 3 | PS | 40 | — | — | — | 110 | — | 2 | −2 | C |
| Comparative Example 4 | 4 | SAN | 40 | — | — | — | 130 | — | 1 | −4 | C |
| Comparative Example 5 | 5 | Norbornene | 40 | — | — | — | 160 | — | 5 | 50 | C |
| Comparative Example 6 | 6 | Lactone | 40 | — | — | — | 85 | — | 0 | −2 | D |
| Example 1 | 101 | PMMA | 40 | B-7 | 0.56 | 10 | 50 | 0.56 | 5 | 60 | B |
| Example 2 | 102 | PMMA | 25 | B-7 | 0.56 | 40 | 30 | 0.33 | 10 | 100 | B |
| Example 3 | 103 | PS | 40 | B-7 | 0.64 | 10 | 70 | 0.64 | 2 | 60 | B |
| Example 4 | 104 | SAN | 40 | B-7 | 0.54 | 10 | 70 | 0.54 | 3 | 60 | B |
| Example 5 | 105 | Norbornene | 40 | B-7 | 0.39 | 10 | 63 | 0.39 | 10 | 100 | B |
| Example 6 | 106 | PMMA | 40 | C-1 | 0.56 | 10 | 50 | 0.56 | 0 | −1 | B |
| Example 7 | 107 | Lactone | 40 | B-7 | 0.61 | 10 | 52 | 0.61 | 4 | 55 | B |
| Example 8 | 108 | PMMA | 40 | C-1 | 0.48 | 10 | 43 | .048 | −1 | −2 | B |
| Example 9 | 109 | Norbornene | 40 | B-7 | 0.31 | 10 | 50 | 0.31 | 20 | 70 | B |
| Example 10 | 110 | PMMA | 40 | C-2 | 0.56 | 10 | 50 | 0.56 | 0 | −1 | B |
| Example 11 | 111 | PMMA | 40 | C-2 | 0.56 | 30 | 30 | 0.33 | 0 | 0 | A |
| Example 12 | 112 | Norbornene | 40 | C-3 | 0.78 | 30 | 70 | 0.44 | 2 | 7 | B |
| Example 13 | 113 | Norbornene | 40 | C-4 | 0.41 | 10 | 66 | 0.41 | 1 | 4 | B |
| Example 14 | 114 | Norbornene | 40 | C-4 | 0.41 | 30 | 25 | 0.16 | 2 | 4 | A |
| Example 15 | 115 | Norbornene | 40 | C-5 | 0.64 | 25 | 70 | 0.44 | 2 | 5 | B |

TABLE 2

| | | Comparative Example 2 | Comparative Example 3 | Comparative Example 4 | Comparative Example 5 | Example 1 | Example 2 | Example 3 | Example 4 |
|---|---|---|---|---|---|---|---|---|---|
| Film position | Viewer side | Film #2 | Film #3 | Film #4 | Film #5 | Film #101 | Film #102 | Film #103 | Film #104 |
| | Cell side | | | | ZRD40 | | | | |

| | | Example 5 | Example 6 | Example 7 | Example 8 | Example 9 | Example 10 | Example 11 | Example 12 |
|---|---|---|---|---|---|---|---|---|---|
| Film position | Viewer side | Film #105 | Film #106 | Film #107 | Film #108 | Film #109 | Film #110 | Film #111 | Film #112 |
| | Cell side | | | | ZRD40 | | | | |

| | | Example 13 | Example 14 | Example 15 |
|---|---|---|---|---|
| Film position | Viewer side | Film #113 | Film #114 | Film #115 |
| | Cell side | | ZRD40 | |

As a result of mounting the optical films and the polarization plates produced in Examples 1 to 15 on 42-inch panels, it could be confirmed from Table 1 that, in a case in which the optical film of the present invention was used, black display unevenness after the aging of the panels in a high temperature and humidity environment was reduced. In addition, Example 12 was excellent in terms of durability compared with Example 15.

It was found that, among them, particularly when moisture permeability a/moisture permeability B is 0.4 or less, and the moisture permeability is 30 g/m²/day or less, the unevenness-improving effect is strong.

What is claimed is:

1. An optical film including a thermoplastic resin,
wherein the optical film has a moisture permeability of 70 g/m²/day or less, and
contains a moisture permeability-reducing compound having a molecular weight of 200 or more and satisfying Formula (1) described below,
wherein the moisture permeability-reducing compound is a compound represented by General Formula (B) described below, a phenolic resin represented by General Formula (C) described below, a terpene resin, an aromatic hydrocarbon formaldehyde resin, or barbituric acid;

$$A/B \leq 9 \qquad \text{Formula (1)}$$

in Formula (1), A represents a moisture permeability of an optical film in a case in which 10 mass % of the moisture permeability-reducing compound is added to the mass of the thermoplastic resin, B represents a moisture permeability of an optical film in a case in which the thermoplastic resin is included and the moisture permeability-reducing compound is not added,
with the proviso that the moisture permeability is a moisture permeability in terms of a film thickness of 40 μm of the optical film after 24 hours at 40° C. under a relative humidity of 90% using a method of JIS Z-0208,

[Chem. 1]

General Formula (B)

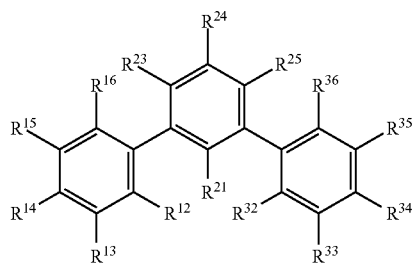

in General Formula (B), each of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ independently represents a hydrogen atom or a substituent, and at least one of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ is an amino group, an acylamino group, an alkoxycarbonylamino group, an aryloxycarbonylamino group, a sulfonylamino group, a hydroxyl group, a mercapto group, or a carboxyl group, and General Formula (C)

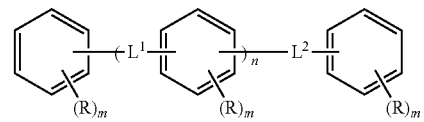

in General Formula (C), n represents 1 to 10, each of ms independently represents an integer of 1 to 4, each of Rs independently represents a hydrogen atom, a —OH group, or an alkyl group having 1 to 10 carbon atoms which may have a substituent, at least one of Rs represents a group having a —OH group, and each of $L^1$ and $L^2$ independently represents a methylene group or —CH₂—O—CH₂—.

2. The optical film according to claim 1,
wherein Formula (2) described below is satisfied, $$a/B \leq 0.9 \qquad \text{Formula (2)}$$

in Formula (2), a represents a moisture permeability of an optical film in a case in which the thermoplastic resin and the moisture permeability-reducing compound are included, B represents a moisture permeability of an optical film in a case in which the thermoplastic resin is included and the moisture permeability-reducing compound is not added;
the moisture permeability is a moisture permeability in terms of a film thickness of 40 μm of the optical film after 24 hours at 40° C. under a relative humidity of 90% using the method of JIS Z-0208.

3. The optical film according to claim 1,
wherein the moisture permeability-reducing compound is a novolac-type phenolic resin, a hydrogenated terpene resin, a xylene resin, or barbituric acid.

4. The optical film according to claim 1,
wherein the moisture permeability-reducing compound is a novolac-type phenolic resin, a hydrogenated terpene resin, or a xylene resin.

5. The optical film according to claim 1,
wherein the moisture permeability-reducing compound has three or more aromatic rings.

6. The optical film according to claim 1,
wherein the moisture permeability-reducing compound is represented by General Formula (C) described below,

[Chem. 2]

General Formula (C)

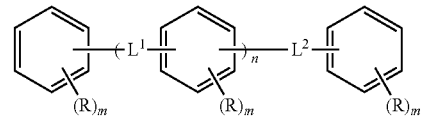

in General Formula (C), n represents 1 to 10, each of ms independently represents an integer of 1 to 4, each of Rs independently represents a hydrogen atom, a —OH group, or an alkyl group having 1 to 10 carbon atoms which may have a substituent, at least one of Rs represents a group having a —OH group, and each of $L^1$ and $L^2$ independently represents a methylene group or —CH₂—O—CH₂—.

7. The optical film according to claim 1,
wherein the moisture permeability-reducing compound is a novolac-type phenolic resin or a xylene resin.

8. The optical film according to claim 1, comprising:
1 mass % or more of the moisture permeability-reducing compound with respect to the mass of the thermoplastic resin.

9. The optical film according to claim 1,
wherein the film thickness is 60 μm or less.

10. The optical film according to claim 1,
wherein Re and Rth defined by Formula (I) described below and Formula (II) described below satisfy Formula (III) described below and Formula (IV) described below at a wavelength of 590 nm, $$Re=(nx-ny)\times d \qquad \text{Formula (I)}$$

$$Rth=\{(nx+ny)/2-nz\}\times d \qquad \text{Formula (II)}$$

$$|Re|\leq 50\ nm \qquad \text{Formula (III)}$$

$$|Rth|\leq 300\ nm \qquad \text{Formula (IV)}$$

in Formulae (I) to (IV), nx is a refractive index in an in-plane slow axis direction of the optical film, ny is a refractive index in an in-plane fast axis direction of the optical film, nz is a refractive index in a thickness direction of the optical film, and d is a thickness, of which unit is nm, of the optical film.

11. The optical film according to claim 1,
wherein the optical film is manufactured by casting a macromolecular solution including the thermoplastic resin, the moisture permeability-reducing compound, and a solvent on a support.

12. The optical film according to claim 1,
wherein a functional layer having a film thickness in a range of 0.1 μm to 20 μm is present on at least one surface of the optical film.

13. The optical film according to claim 12,
wherein a moisture permeability (C) of the optical film in a case in which the functional layer is laminated and a moisture permeability (D) of just the optical film in a case in which the functional layer is not laminated satisfy C/D≤0.9.

14. A polarization plate comprising:
at least one of the optical film according to claim 1 as a protective film for a polarizer.

15. A liquid crystal display apparatus comprising:
a liquid crystal cell; and
the polarization plate according to claim 14 disposed in at least one side of the liquid crystal cell,
wherein the optical film is disposed so as to serve as an outermost layer.

16. The optical film according to claim 1,
wherein the phenolic resin is a novolac-type phenolic resin represented by General Formula (1) described below,

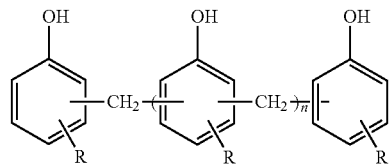

General Formula (1)

in General Formula (1), n represents 1 to 10 on the average, and each of Rs independently represents a hydrogen atom or an alkyl group having 1 to 10 carbon atoms.

17. The optical film according to claim 1,
wherein the moisture permeability-reducing compound is the compound represented by General Formula (B), a terpene resin, an aromatic hydrocarbon formaldehyde resin, or barbituric acid.

18. The optical film according to claim 1,
wherein the moisture permeability-reducing compound is the compound represented by General Formula (B), the phenolic resin represented by General Formula (C), a hydrogenated terpene resin, an aromatic hydrocarbon formaldehyde resin, or barbituric acid.

19. The optical film according to claim 1,
wherein the moisture permeability-reducing compound is the compound represented by General Formula (B), a hydrogenated terpene resin, an aromatic hydrocarbon formaldehyde resin, or barbituric acid.

20. The optical film according to claim 1,
wherein the moisture permeability-reducing compound is the compound represented by General Formula (B), an aromatic hydrocarbon formaldehyde resin, or barbituric acid.

* * * * *